(12) United States Patent
Bruce

(10) Patent No.: US 11,643,940 B2
(45) Date of Patent: *May 9, 2023

(54) ELECTRICAL POWER SYSTEMS

(71) Applicant: ROLLS-ROYCE PLC, London (GB)

(72) Inventor: Graham P Bruce, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,517

(22) Filed: Dec. 8, 2021

(65) Prior Publication Data

US 2022/0281611 A1  Sep. 8, 2022

(30) Foreign Application Priority Data

Mar. 3, 2021 (GB) ...................... 2102977

(51) Int. Cl.
*F01D 15/10* (2006.01)
*H02J 1/10* (2006.01)
(Continued)

(52) U.S. Cl.
CPC ............. *F01D 15/10* (2013.01); *B64D 27/24* (2013.01); *B64D 31/00* (2013.01); *B64D 41/00* (2013.01); *H02H 9/023* (2013.01); *H02J 1/102* (2013.01); *H02J 4/00* (2013.01); *H02K 7/1823* (2013.01); *B60L 2200/10* (2013.01); *B64D 27/10* (2013.01); *B64D 2027/026* (2013.01);
(Continued)

(58) Field of Classification Search
CPC ..... Y02T 50/60; Y02T 50/50; B64D 2221/00; B64D 41/00; H02J 1/10; H02J 1/102; H02J 1/106; H02J 4/00; H02J 2310/44; B60L 2200/10; H02H 9/023; H02H 9/025; H02H 9/02
See application file for complete search history.

(56) References Cited

U.S. PATENT DOCUMENTS

2004/0051383 A1  3/2004  Clark et al.
2010/0080027 A1  4/2010  Wiegman et al.
(Continued)

FOREIGN PATENT DOCUMENTS

EP  3 793 050 A1  3/2021
EP  3 793 051 A1  3/2021
(Continued)

OTHER PUBLICATIONS

May 9, 2022 Extended European Search Report for Application No. 21213011.6.
(Continued)

*Primary Examiner* — Ryan Johnson
(74) *Attorney, Agent, or Firm* — Oliff PLC

(57) ABSTRACT

Electrical power systems for distributing electrical power in aircraft are described. One such electrical power system comprises: an electrical power source configured to output a number R≥2 of dc power channels, each dc power channel having a respective index r=(1, . . . , R); and a group of N dc load channels connected to the R dc power channels by a switching arrangement, wherein each dc load channel has a respective index n=(1, . . . , N) and R<N≤2R. The switching arrangement is operable to connect the r-th power channel to the n-th load channel according to a relationship r(n).

20 Claims, 11 Drawing Sheets

R=2, N=4, N=2R

(51) Int. Cl.
    *H02K 7/18*     (2006.01)
    *B64D 27/24*    (2006.01)
    *B64D 31/00*    (2006.01)
    *H02H 9/02*     (2006.01)
    *B64D 41/00*    (2006.01)
    *H02J 4/00*     (2006.01)
    *B64D 27/10*    (2006.01)
    *B64D 27/02*    (2006.01)

(52) U.S. Cl.
    CPC .... *B64D 2221/00* (2013.01); *F05D 2220/323* (2013.01); *F05D 2220/76* (2013.01); *H02J 2310/44* (2020.01); *Y02T 50/60* (2013.01)

(56) References Cited

U.S. PATENT DOCUMENTS

| | | | |
|---|---|---|---|
| 2013/0200714 | A1 | 8/2013 | Pan et al. |
| 2016/0094039 | A1 | 3/2016 | Winstanley et al. |
| 2019/0181669 | A1 | 6/2019 | Solodovnik et al. |
| 2021/0021217 | A1 | 1/2021 | Shirokov |
| 2021/0070463 | A1 | 3/2021 | Husband et al. |
| 2021/0071573 | A1 | 3/2021 | Brookes et al. |
| 2021/0071583 | A1 | 3/2021 | Bruce et al. |
| 2021/0075283 | A1 | 3/2021 | Turvey |
| 2021/0075285 | A1 | 3/2021 | Husband et al. |
| 2021/0339877 | A1 | 11/2021 | Salanne et al. |
| 2022/0009643 | A1* | 1/2022 | Datta .................... B64D 27/02 |

FOREIGN PATENT DOCUMENTS

| | | |
|---|---|---|
| EP | 3 793 071 A1 | 3/2021 |
| EP | 3 796 502 A1 | 3/2021 |
| FR | 3087960 A1 | 5/2020 |
| GB | 2479535 A | 10/2011 |
| GB | 2585855 A | 1/2021 |
| GB | 2587186 A | 3/2021 |
| WO | 2015/183353 A1 | 12/2015 |
| WO | 2020/217007 A1 | 10/2020 |

OTHER PUBLICATIONS

May 11, 2022 Extended European Search Report for Application No. 21213016.5.
May 10, 2022 Extended European Search Report for Application No. 21213013.2.
May 11, 2022 Extended European Search Report for Application No. 21213015.7.
May 10, 2022 Extended European Search Report for Application No. 21213012.4.
May 11, 2022 Extended European Search Report for Application No. 21213014.0.
Aug. 23, 2021 Search Report issued in Great Britain Application No. 2102973.1.
Aug. 23, 2021 Search Report issued in Great Britain Application No. 2102976.4.
Aug. 23, 2021 Search Report issued in Great Britain Application No. 2102977.2.
U.S. Appl. No. 17/545,283, filed Dec. 8, 2021 in the name of BRUCE.
U.S. Appl. No. 17/545,312, filed Dec. 8, 2021 in the name of BRUCE.
U.S. Appl. No. 17/545,347, filed Dec. 8, 2021 in the name of BRUCE.
U.S. Appl. No. 17/545,302, filed Dec. 8, 2021 in the name of BRUCE.
U.S. Appl. No. 17/545,446, filed Dec. 8, 2021 in the name of BRUCE.
Nov. 30, 2022 Office Action issued in U.S. Appl. No. 17/545,302.
Dec. 1, 2022 Office Action issued in the U.S. Appl. No. 17/545,446.
Feb. 17, 2023 Notice of Allowance issued In U.S. Appl. No. 17/545,446.
Feb. 22, 2023 Notice of Allowance issued In U.S. Appl. No. 17/545,302.

* cited by examiner

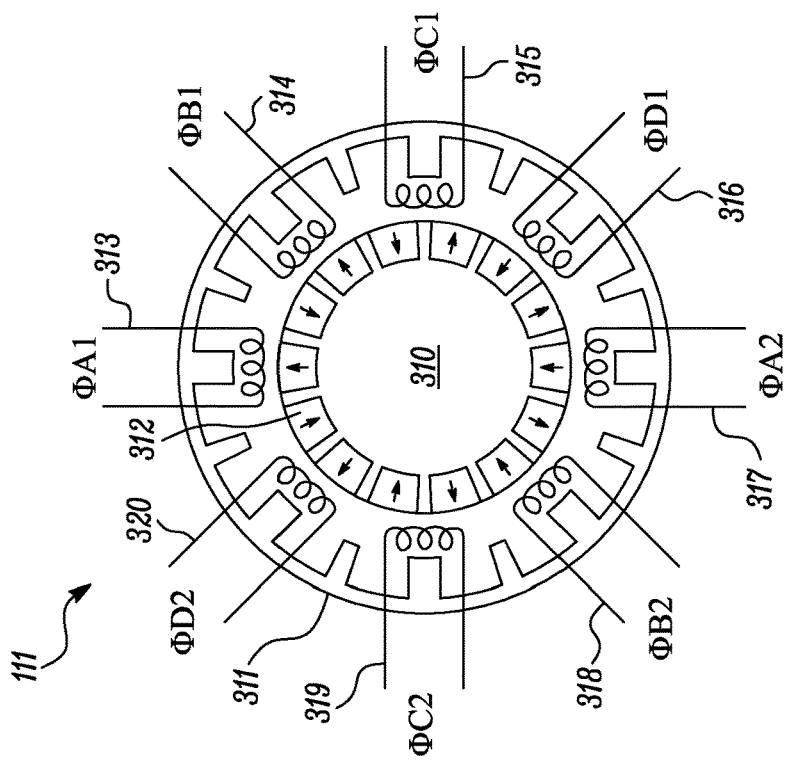
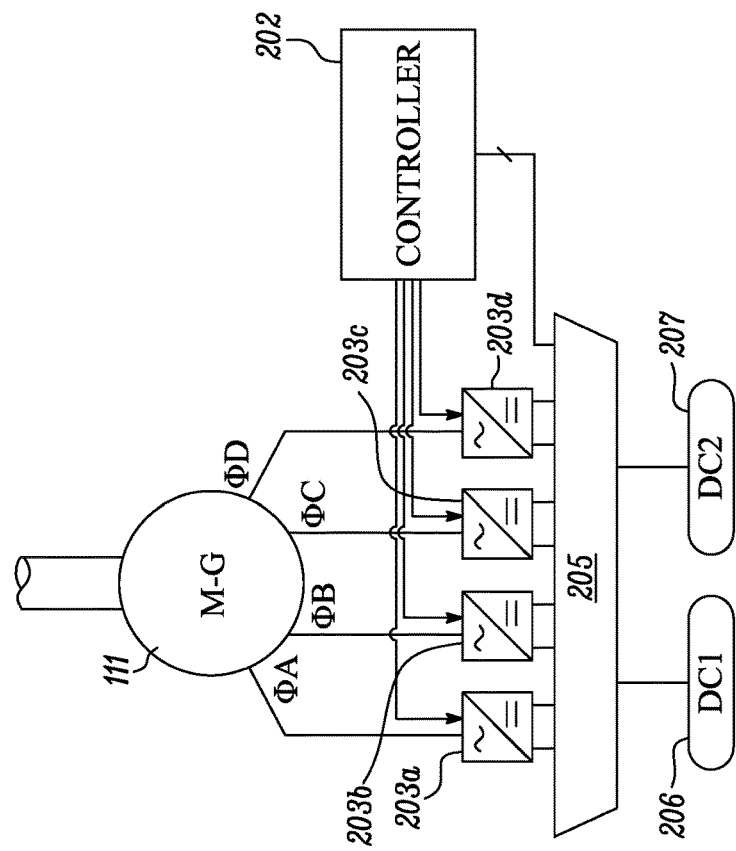
FIG. 3B
FIG. 3A

ELECTRICAL POWER SYSTEMS

CROSS-REFERENCE TO RELATED APPLICATIONS

This specification is based upon and claims the benefit of priority from United Kingdom Patent Application Number 2102977.2, filed on 3 Mar. 2021, the entire contents of which are incorporated herein by reference.

TECHNICAL FIELD

This disclosure concerns electrical power systems for distributing electrical power, particularly in aircraft.

BACKGROUND

In aerospace, the more electric engine (MEE) and more electric aircraft (MEA) concepts have been advocated for the substantial reduction in fuel consumption and complexity they bring. For example, one known aircraft configuration includes in its engines electric machines operable as both motors and generators so as to facilitate both generation of electrical power during flight but also starting of the engine and removal of the air-turbine starter. One engine configuration for this known aircraft includes such electric machines coupled to the high-pressure spool of a twin-spool turbofan. Another includes such electric machines coupled to the intermediate-pressure spool of a triple-spool turbofan. Some configurations facilitate power transfer between spools of a gas turbine engine, which studies have shown can provide improvements in terms of component life and specific fuel consumption as well as a reduction in the size of the turbomachinery.

Furthermore, the desire to reduce fuel consumption and emissions has created increased interest in hybrid electric (HE) aircraft. Series hybrid architectures include electrically-driven propulsors, with the electrical power being provided by a combination of a generator, which is driven by a gas turbine or other rotating machinery, and batteries, with the latter generally be charged by the former during some flight stages. Parallel hybrid architectures typically utilise a turbofan or turboprop engine for propulsion, with batteries which drive electric motors coupled to the spools of the turbomachinery providing additional drive power to the engine. Other hybrid electric propulsion systems share features of both the series and parallel architectures. Purely electric (PE) aircraft, whose power and propulsion systems include electric machines and batteries and/or fuel cells, are also of interest.

Previous designs have, typically, delivered power to engine accessories such as the engine fuel pump via a mechanical interface between an engine accessory gearbox, which is connected to an engine spool, and an electrical generator dedicated to powering the fuel pump. More electric and hybrid electric platforms may however make greater use of electrical distribution systems that are not dedicated to a particular function. For instance, electrically-powered engine accessories and non-engine aircraft electrical systems may both be powered using electrical power taken from a non-dedicated electrical power system.

Whilst the latter approach may increase efficiency and reduce weight and complexity, it has the potential to create hazardous new fault conditions and thus system certification issues. Service experience has shown that the means of electrical generation and distribution in such configurations can and do fail from time to time. It is essential that if a fault occurs in the electrical generation and/or distribution system, critical electrical loads such as an electric fuel pump can still function. Further, if an electrical load experiences a fault then that fault should not affect the functionality of the wider electrical distribution system and the other electrical loads. For instance, in a more electric aircraft, if there is a fault affecting one electrical load, the fault should not affect the function of other loads, especially critical loads such as fuel and oil pumps. In a hybrid-electric aircraft, a fault in a non-propulsive load should not be capable of starving the propulsion system of electrical power, nor should the propulsion system starve critical non-propulsive loads in case of a fault or transient event.

Thus, it is an object of the invention to provide an electrical power system for distributing electrical power in a suitably fault-tolerant manner.

In this specification, the following mathematical notation is assigned to objects for the purposes of clarity and conciseness. A collection of objects having an ordered relationship may be represented as a sequence of members. For a finite sequence σ of length N, each member has an associated index n identifying its position in the sequence.

As used herein, the length of a sequence is denoted by an uppercase letter, with the variable representing the indices of the members of the sequence denoted by the equivalent lowercase letter. In this way it is possible herein to concisely define properties of each member of a sequence.

For example, let a sequence α have length N=8 such that the members each have an associated index n. It is possible to state that for all n≡0 (mod 2), the nth member has property X. In this way a particular property is defined over the even-indexed members. This is in contrast to having to set out that each of the second member, the fourth member, the sixth member, and the eighth member has property X. Thus it may be seen that great improvements in conciseness are possible for sequences of large length with properties shared over a mathematically-defined sub-sequence.

Furthermore, say we wish to describe links between the members of a multiplicity of sequences. For example, let a sequence β have a length P=3, and let a sequence γ also have a length P=3. The members of both sequences therefore have an index p associated therewith. Given these definitions, we may concisely state that for all p=(1 . . . P), the pth member of sequence β is linked to the pth member of sequence γ. This is in contrast to having to set out that the first member of sequence β is linked to the first member of sequence γ, the second member of sequence β is linked to the second member of set γ, and the third member of sequence β is linked to the third member of sequence γ. Whilst the statements are equivalent, it will be appreciated that by using the notation explained heretofore significant improvements in conciseness are achieved.

SUMMARY

The invention is directed towards electrical power systems for distributing electrical power, particularly in aircraft.

According to a first aspect, there is provided an electrical power system for distributing electrical power in an aircraft. The electrical power system comprises: an electrical power source configured to output a number R≥2 of dc power channels, each dc power channel having a respective index r=(1, . . . , R); and a group of N dc load channels connected to the R dc power channels by a switching arrangement, wherein N>R and each dc load channel has a respective index n=(1, . . . , N).

The following features may be applied singularly or in combination with each other and all of the aspects provided herein.

In some embodiments, the electrical power source may comprise one or more rotary electric machines, each mechanically coupled to a gas turbine engine spool. The system may comprise a set of converter circuits connected to the one or more rotary electric machines for conversion between alternating current (ac) and direct current (dc), and the one or more rotary electric machines and the set of converter circuits are configured to output the number R≥2 of dc power channels. The rotary electric machines may be directly coupled to the gas turbine engine spools or indirectly coupled to the gas turbine engine spools, for example via an engine accessory gearbox.

In some embodiments the electrical power source comprises an energy storage system, for example one or more batteries (e.g. one or more battery packs or battery modules). In some embodiments the electrical power source comprises one or more fuel cells.

The switching arrangement may comprise switching elements, for example contactors or circuit-breakers. The switching elements may be solid-state switching elements, electromechanical switching elements or hybrid solid-state and electromechanical switching elements. The opening and closing of the switching elements may be controlled in order to commutate the electrical load current.

The system may further comprise, for each respective one of a plurality of the N load channels, a current limiting device (CLD) operable to limit an amount of current flowing from the power channels to a load connectable to the electrical power system via the respective load channel.

The system may comprise a CLD for each one of the N load channels

Each respective CLD may instead be operable to limit an amount of current flowing to the power channels from the load.

Each respective CLD may be bidirectional such that it is further operable to limit an amount of current flowing to the power channels from the load. Each bidirectional CLD may include a pair of unidirectional CLDs connected in antiparallel.

Each CLD may comprise one or more of: a passive CLD component such as an inductor; an active CLD component such a current limiting diode; and/or a superconducting fault current limiter.

The CLDs may be: located on a side of the switching arrangement opposite to the power channels; or located between the power channels and the switching arrangement; or incorporated into the switching elements of the switching arrangement.

The switching arrangement may be operable to connect a number Q≥1 of the N load channels to at least two different power channels of the R power channels.

The system may further comprise a controller configured to control the operation of the switching arrangement to control which of the power channels the N load channels receive electrical power from.

The controller may be configured to control the switching arrangement so that, at all times, each respective one of the N load channels receives power from only one of the power channels to which the switching arrangement can connect it.

The controller may be configured to control the switching arrangement so that in a no fault condition, each one of the R power channels delivers power to a number of load channels not exceeding $\lceil N/R \rceil$.

In a no fault condition, each one of the Q load channels may be connected to and receive power from both of the two different power channels to which it is connected by the switching arrangement. For example, switching elements (e.g. dc contactors) associated with both of the power channels may be closed so that the load channel is connected to and receives power from both of the power channels.

The controller may be configured to control the operation of the switching arrangement so that in a fault condition in which any one of the R power channels has a fault, each one of the R power channels delivers power to a number of load channels not exceeding $\lceil N/R \rceil + 1$.

The controller may be configured to control the operation of the switching arrangement so that, in a fault condition in which one of the R power channels has a fault, each one of the respective Q load channels receives power from a non-faulted power channel of the at least two dc power channels to which the respective one of the Q loads channel can be connected by the switching arrangement.

In some embodiments Q=N, such that the switching arrangement is operable to connect every one of the N load channels to at least two different power channels.

In some embodiments Q<N, and the switching arrangement is operable to connect the remaining N−Q load channels to only one of the R power channels.

In some embodiments Q=N−2, and the switching arrangement is operable to connect the n=1 load channel to only the r=1 power channel; the n=N load channel to only the r=R power channel; and, for each respective one of the remaining Q=N−2 load channels, the respective load channel to at least two different power channels of the R power channels.

In some embodiments Q=N−R, and the switching arrangement connects the n=(1, . . . , R) load channel to only the r=(1, . . . , R) power channel; and the switching arrangement is operable to connect each of the remaining Q=N−R load channels to at least two different power channels.

In some embodiments, for each respective one of the number Q of the N load channels, the switching arrangement is operable to connect the respective load channel to precisely two different power channels.

In some embodiments, R<N≤2R. In these embodiments, the switching arrangement may be operable to connect the r-th power channel to the n-th load channel according to the relationship:

$$r(n) = \begin{cases} 1, & n = 1 \\ \frac{n}{2} \text{ and } \frac{n}{2}+1, & 1 < n < N \text{ and } n = 0 \,(\text{mod } 2) \\ \frac{n-1}{2} \text{ and } \frac{n+1}{2}, & 1 < n < N \text{ and } n = 1 \,(\text{mod } 2) \\ R, & n = N \end{cases}.$$

In some embodiments, N=2R.
In some embodiments, R=2, 3 or 4.
In some embodiments, N≥4.

The N dc load channels may be connected to and power a poly-phase electrical load. A controller may be configured to control the switching arrangement so that, in a no fault condition, pairs of phases of the poly-phase electrical load are powered by the same power channels so as to reduce the harmonic content in the supply current. The two phases of each pair of phases may be electrically separated by 360/P degrees, P being a total number of phases of the poly-phase electrical load.

The electrical power system may further comprise a set of converter circuits for conversion between direct current flowing in the load channels and alternating current for powering one or more ac loads.

The N load channels may be connected to one or more loads including at least one of: an electrically driven fuel pump; an electrically driven oil pump; and an electrically driven cabin blower.

The N load channels may be connected to one or more loads including at least one propulsive load. The propulsive load may comprise an electrical machine comprising at least two submachines.

According to a second aspect, there is provided a gas turbine engine comprising the electrical power system of the first aspect. One or more rotary electric machines of the electrical power system may be mechanically coupled to one or more spools of the gas turbine engine.

According to a third aspect, there is provided arrangement comprising: a first gas turbine engine having a spool; a second gas turbine engine having a spool; and the electrical power system of the first aspect. One or more rotary electric machines of the electrical power system may include a first rotary electric machine mechanically coupled to the spool of the first gas turbine engine and a second rotary electric machine connected to the spool of the second gas turbine engine.

According to a fourth aspect, there is provided an aircraft propulsion system comprising the electrical power system of the first aspect. The propulsion system may be a hybrid electric propulsion system. The propulsion system may comprise: one or more gas turbine engines, wherein one or more rotary electric machines of the electrical power system are mechanically coupled to one or more spools of the one or more gas turbine engines; and one or more propulsors. The R power channels of the electrical power system may be arranged to deliver electrical power to the one or more propulsors, and the N load channels may be electrically connected to one or more non-propulsive loads.

According to a fifth aspect, there is provided an aircraft comprising an electrical power system of the first aspect, a gas turbine engine according to the second aspect, an arrangement according to the third aspect or a propulsion system according to the fourth aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which:

FIG. 3A shows an exemplary arrangement for connecting a single rotary electric machine to two dc power channels;

FIG. 3B shows the winding configuration of the electric machine of FIG. 3A;

DETAILED DESCRIPTION

FIG. 1

Figure 1:
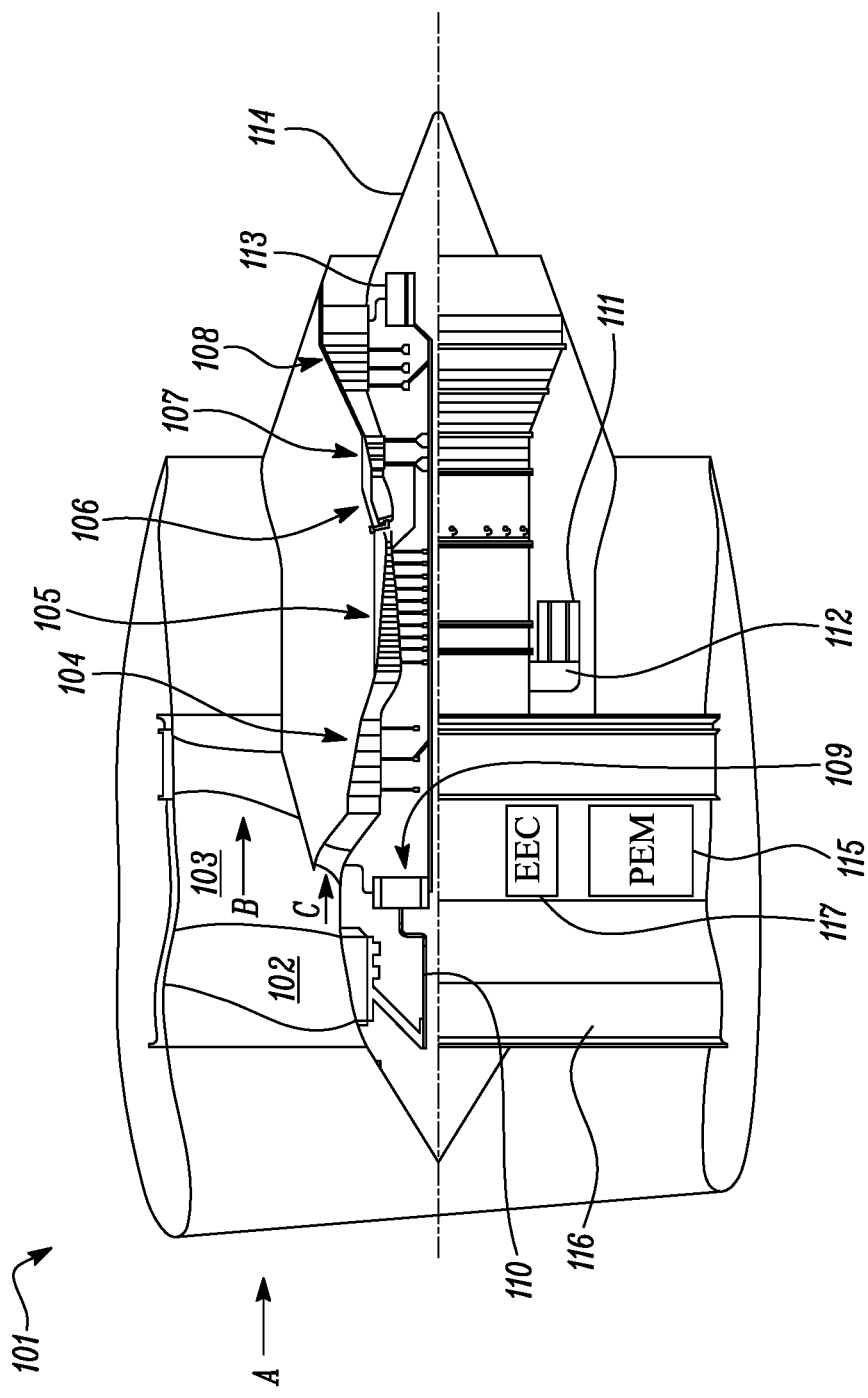
FIG. 1 shows a general arrangement of a turbofan engine for an aircraft, including a rotary electric machine on each spool thereof.

A general arrangement of an engine 101 for an aircraft is shown in FIG. 1. In the present embodiment, the engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn are meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead.

As described previously, it is desirable to facilitate a greater degree of electrical functionality on the airframe and on the engine. To this end, the engine 101 comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high pressure spool and a second rotary electric machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

In the present embodiment, the first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electric machines 111 and 113. In this way, the EEC 117 may holistically respond to both thrust demand and electrical power demand.

In an implementation contemplated herein, the one or more rotary electric machines 111, 113 and the power electronics 115 are configured to output to or receive electric power from two dc busses (also referred to herein as dc power channels)—a configuration contemplated for some future more electric aircraft platforms. An exemplary two-machine, two dc bus configuration, suitable for shaft power transfer in addition to electrical generation and distribution, will be described with reference to FIGS. 2A and 2B. An exemplary single machine configuration that outputs to or receives electric power from two dc busses will be described with reference to FIGS. 3A and 3B.

It is to be understood that the present invention, which will be described with reference to FIGS. 4 to 14, is not limited to the configurations described with reference to FIGS. 2A-B and 3A-B. Indeed, the present invention may be implemented in a system that includes one, two or more rotary electric machines. These one or more machines may be coupled to the same spool or different spools of a single gas turbine engine, or to spools of different gas turbine engines. Further, although an architecture with two dc busses is contemplated, the present invention may also be implemented in architectures having three, four or more dc busses. The skilled person will appreciate that the arrangements described in FIGS. 2A-2B and 3A-3B, and indeed other arrangements, may be modified to output to three or more dc busses according to the desired application.

It should also be understood that the present invention may be implemented within a hybrid electric architecture. For example, the one or more rotary electric machines described above may take the form of electrical generators connected to a gas turbine engine in a series hybrid architecture, with the two or more dc busses powering propulsive and non-propulsive loads. Similarly, the one or more rotary electric machines described above may take the form of motor-generators connected to propulsive turbomachinery in a parallel hybrid architecture. The present invention may be implemented within a purely electric architecture, with one or more dc power sources such as batteries and/or fuel cells outputting dc busses in place of the spool-coupled rotary electric machines.

FIGS. 2A-2B

Figures 2A, 2B:
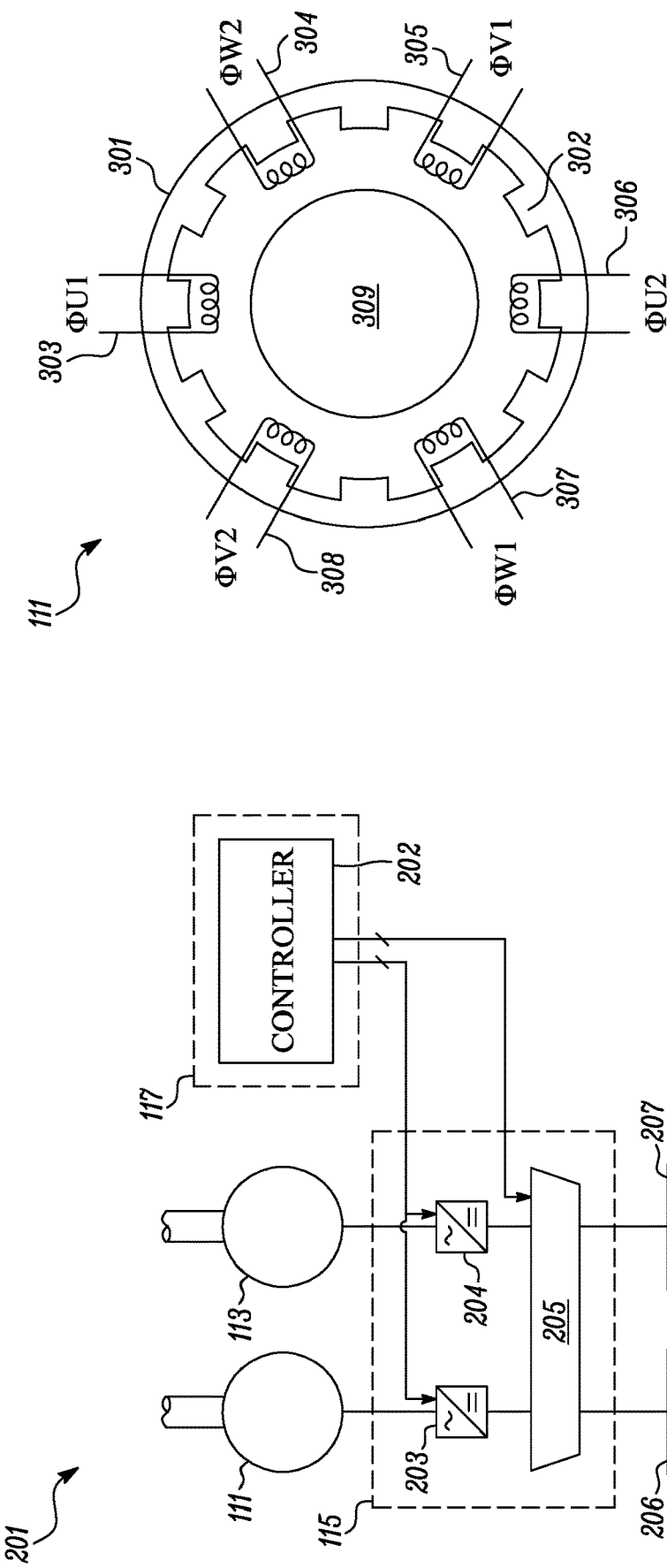
FIG. 2A shows an exemplary arrangement for connecting two rotary electric machines to two dc power channels.
FIG. 2B shows the winding configuration of one of the electric machines of FIG. 2A.

An electric drive system 201 for connecting first and second electric machines 111 and 113 to high- and low-pressure spools of a gas turbine engine is shown in FIG. 2A. The electric drive system 201 is shown in the form of a single line diagram, the conventions of which will be familiar to those skilled in the art. Thus for alternating current (ac) a single line replaces a plurality of polyphase lines, and for direct current (dc) a single line replaces the +V and −V lines.

In the illustrated configuration, the ac output of the electric machines is provided to the PEM 115. The configuration of the electric machines will be described further with reference to FIG. 2B.

A controller 202 for the PEM 115 is provided in the EEC 117. In the present example, the controller 202 is a functional module implemented in software running on the EEC 117. It will be appreciated that in alternative embodiments the controller 202 may be implemented in hardware in the EEC 117. It will also be appreciated that the controller 202 may be a separate module in addition to the EEC 117.

As shown in FIG. 2A, a first set of bidirectional converter circuits 203 is connected with the first electric machine 111, and a second set of bidirectional converter circuits 204 is connected with the second electric machine 113. The controller 202 is configured to control the operation of the first and second sets of bidirectional converter circuits 203 and 204 so as to control the operation of the electric machines 111 and 113.

The bidirectional converter circuits are configured to convert alternating current to and from direct current. In the present embodiment, the direct current output of the converter circuits is provided to a switching arrangement 205 for connection to a two-channel aircraft dc network, comprising a first dc bus 206 and a second dc bus 207.

In the present example, the switching circuit 205 is operable to connect or disconnect the bidirectional converters to each other, and the dc busses. In this way, various faults may be managed, whilst maintaining the capability to transfer power between the gas turbine spools.

The arrangement and control of the switching arrangement 205 is described in more detail in UK Patent Application Number 1913016.0 and corresponding European Patent Application Number 20190181.6 (published as EP 3793051 A1), both of which are assigned to the present applicant. The entire contents of both applications are incorporated herein by reference.

The first electric machine 111 of FIG. 2A is shown in FIG. 2B. In the present embodiment, the configuration—so far as described herein—of the second electric machine 113 is the same.

The first electric machine 111 is a dual-wound rotary electric machine. The term "dual-wound" will be understood by those skilled in the art to mean that it may be considered to comprise two functionally separate submachines. Further, in the present implementation, these submachines are three-phase submachines. It will be appreciated that the number of phases could differ, and in particular may be greater than two. The maximum number is typically limited by space constraints, and would normally be less than nine.

As shown in the Figure, in the present embodiment the first electric machine 111 comprises a stator 301 having twelve teeth 302. Six coils 303, 304, 305, 306, 307, and 308 are wound on alternate teeth such that there is only one coil side per slot. This will be recognised by those skilled in the art as a concentrated winding arrangement. In this way, the coils are electrically, electromagnetically, thermally, and mechanically separated to provide fault-tolerance. In the present embodiment, the "dual-winding" of the first electric machine 111 is achieved by designating opposite coils as part of separate submachines. Thus, coil 303 forms a phase ϕU1, and coil 306 forms a phase ϕU2. A similar configuration is adopted for the other coils. Phases ϕU1, ϕV1, and ϕW1 which form a first submachine are in the present embodiment connected in a star winding (also known as a wye winding), as are—in a separate connection—phases ϕU2, ϕV2 and ϕW2 which form the second submachine. It will be appreciated that a delta winding may be used instead.

In the present embodiment, the first electric machine 111 is a permanent magnet electric machine. Thus, in operation as a motor, magnetic fields generated by the coils 303 to 308 interact with permanent magnets on a rotor 309 which generates torque. In operation as a generator, the magnetic field of the rotor 309 interacts with the coils 303 to 308 to generate a voltage.

It will be appreciated that different machine types may be used. For example, a distributed winding scheme could be used. Also, machines of induction, wound-field or switched-reluctance type may be used. Further, the machines may instead be of transverse- or axial-flux configuration.

It is also contemplated that in alternative embodiments the submachines may be formed not by different winding sets wound around the same stator 301, but by axially separate machines each having one of the two windings of the dual winding. Alternatively, the machines may be of radially-segmented stator type in which each submachine occupies a different sector of the stator.

It should also be appreciated that whilst the electric drive system 201 of FIG. 2A includes two dual-wound machines 111, 113 that output, via the sets of converter circuits 203, 204 and switching arrangement 205, two dc busses 206, 207, the arrangement could be generalised to a greater number of dc busses. For instance, an additional dual-wound machine, along with an additional set of converters and additional switching could be used to provide a fault-tolerant drive system 201 that outputs four dc busses.

FIGS. 3A-3B

As described previously, in an aspect a single motor-generator 111 may be configured such that it outputs to or receives electrical power from two dc busses 206, 207 in a more electric or hybrid electric aircraft installation. Such a system is shown in FIG. 3A, again in the form of a logical single line diagram.

The motor-generator 111 comprises four phase connections, ϕA, ϕB, ϕC, and ϕD, which are each connected with an ac side of a respective independent phase drive circuit 203a, 203b, 203c, and 203d. As will be described with reference to FIG. 3B, in the present embodiment the internal topology of the motor-generator 111 is of duplex four phase configuration, and thus in practice an additional set of connections may be provided to provide parallel connection. Alternatively connection may be made in series either internally to the motor-generator 111 or externally.

Referring again to FIG. 3A, in the present embodiment the phase drive circuits 203a-d are bidirectional converter circuits. In a specific embodiment, the phase drive circuits 203a-d are H-bridges accompanied by appropriate filters, although it will be appreciated that any other suitable bidirectional converter topology may be used, such as a neutral point clamped converter topology.

The phase drive circuits 203a-d operate under control of a controller 202, which co-ordinates the operation of the phase drive circuits 203a-d to effect rectification or inversion as appropriate.

In the present embodiment, the controller 202 in turn operates under control of the EEC 117 in either a motor or generator mode in the known manner.

The dc sides of the phase drive circuits 203a-d are connected to both a first dc bus 206 and a second dc bus 207. A switching arrangement 205, comprising a set of eight electrical contactors (not shown in FIG. 3A), is connected between the dc side of the phase drive circuits 203a-d and the first and second dc busses 206, 207, providing reconfigurable connection and isolation therebetween.

In the present configuration, the contactors of the switching arrangement 205 operate under the control of controller 202. In a non-faulted mode of operation, phases ϕA and ϕC of the motor-generator 111 are connected to the first dc bus 206, and phases ϕB and ϕD of the motor-generator 111 are connected to the second dc bus 207. This may be achieved by controller 205 setting four of the contactors to a closed condition, and setting the other four contactors to an open condition.

This configuration of the system, which is described in more detail in UK Patent Application Number 1913080.6 (published as GB 2587186 A) and corresponding European Patent Application Number 20192313.3 (published as EP 3793071 A), permits each pair of phases φA, φC and φB, φD to remain isolated during fault-free operation. Both of the aforementioned applications are assigned to the present applicant and the entire contents of both are incorporated herein by reference.

The winding configuration of the motor-generator 111 is shown in schematic form in FIG. 3B.

The motor-generator 111 comprises a rotor 310 located interior to a stator 311. The rotor 310 is of permanent magnet configuration, and in this example has 14 permanent magnet poles 312, i.e. the pole pair number p=7.

The stator 311 is configured as an alternate-wound stator, and in this example has sixteen teeth defining sixteen slots, i.e. the slot number $N_S$=16. Eight evenly-spaced coils 313 to 320 are located on alternate teeth such that there is one coil side per slot—this arrangement may also be referred to as a modular winding. This provides physical, thermal, electrical, and magnetic isolation between the coils which provides fault tolerance. In a specific embodiment, the coils 313 to 320 are configured as precision coils, i.e. coils formed identically such that each turn occupies a specific, pre-defined location on the coil.

Forming part of the electric drive system of FIG. 3A, the motor-generator 111 is configured as a four-phase machine. As noted previously, the stator 311 comprises eight coils 313 to 320. In the present embodiment, the motor-generator is configured as a duplex two-phase machine, in which coil pairs separated by 180 degrees form part of the same phase. The individual coils in the present example are connected in parallel with the respective phase drive circuit, although it is envisaged that they may also be connected in series. The choice may be made upon, for example, the ability to run cables and/or the installation space envelope for terminations, etc.

Thus, in the present example, coils 313 and 317 form a coil pair separated by 180 degrees. Both coils form part of phase φA, with coil 313 being labelled φA1, and coil 317 being labelled φA2. Similar angular separation, nomenclature and labelling applies to the other coils. Thus, it may be seen that phase φB is mechanically separated by +45 degrees from φA, phase φC is separated by +90 degrees from φA, and phase φD is separated by +135 degrees from φA. This approach of pairing coils together means that the machine is mechanically balanced, in particular during a fault condition when one or more phases may be disabled.

It will be understood that the electric drive system of FIG. 3A with the duplex machine 111 that, together with the phase drive circuits 203a-d and switching arrangement 205, outputs two dc power channels 206, 207 could be generalised to a higher number of output dc power channels. For instance, the machine 111 could be provided with an additional two phases, and a further two bidirectional converters and four contactors could be provided, to give a drive system that outputs four dc power channels.

FIGS. 4-14

As discussed previously, it is expected that more electric, hybrid electric and purely electric aircraft will make greater use of electrically powered loads and will use non-dedicated electrical power sources to power said loads. For instance, engine accessories such as fuel pumps, oil pumps and cabin blowers will not only become increasingly electric in their design, but electrical power will be delivered to them using dc power channels such as those output in the arrangements described above with reference to FIGS. 2A-B and 3A-B. This is in contrast to many conventional designs in which engine accessories, if electrically powered at all, have their own dedicated electric generator mechanically connected to an engine accessory gearbox.

Whilst this approach may be associated with reduced weight and increased efficiency, the need to deliver electrical power to poly-phase electrical loads in a fault-tolerant manner may undermine these benefits. For example, delivering power to the poly-phase loads in a fault-tolerant manner will require that the installed power capacity is increased beyond the nominal load in case of a fault or failure in the electrical power system, and increased installed capacity generally results in increased weight. Arrangements described herein with reference to FIGS. 4-14 seek to address this and other problems.

The following nomenclature and notation will be used herein. An electrical power system includes a generator electrical drive system, preferably a multi-redundant (e.g. dual-redundant) system such as one of those described with reference to FIGS. 2A-B and 3A-B, which outputs a number R≥2 of dc busses (i.e. power channels). Each of the R dc power channels has a unique index r, where r=(1, . . . , R). At a position electrically downstream of the electrical drive system, a group of N dc load channels are segregated from the dc power channels for powering one or more electrical loads connected thereto. Each of the N dc load channels within a group of dc load channels has a unique index n, where n=(1, . . . , N). The group of N dc load channels is connected to the R dc power channels by a switching arrangement. Downstream of the switching arrangement, the N dc load channels are connectable to one or more electrical loads. Where the electrical load(s) are ac loads, some or all of the N dc load channels may be connected to the load(s) via a set of DC-AC converter circuits, which convert between the direct current carried by the dc load channels and poly-phase alternating current that powers the one or more loads.

Figure 4:
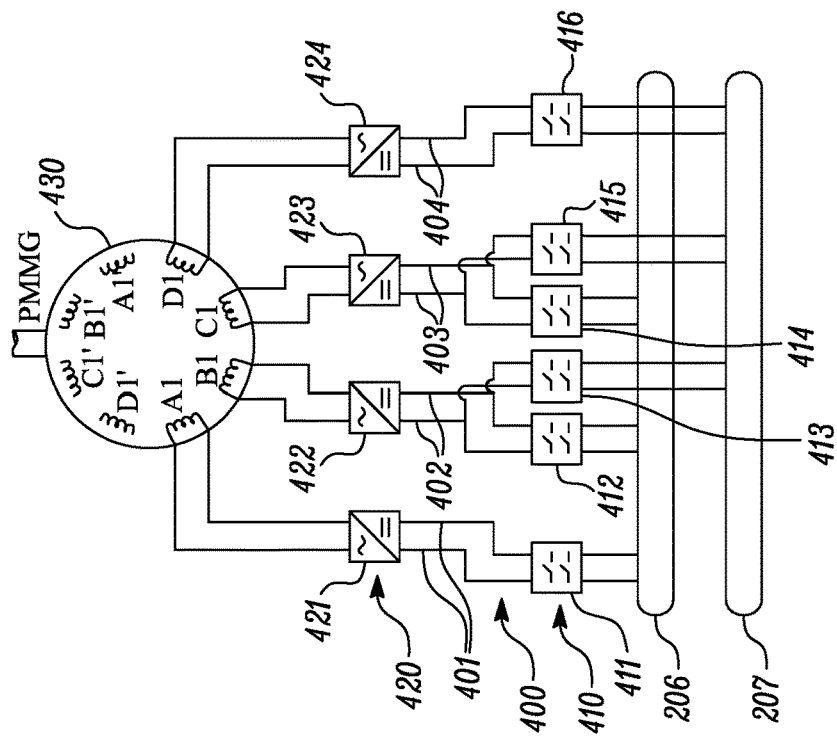
FIG. 4 shows a switching arrangement for connecting a group of N=4 dc load channels to R=2 dc power channels.
Figure 8:
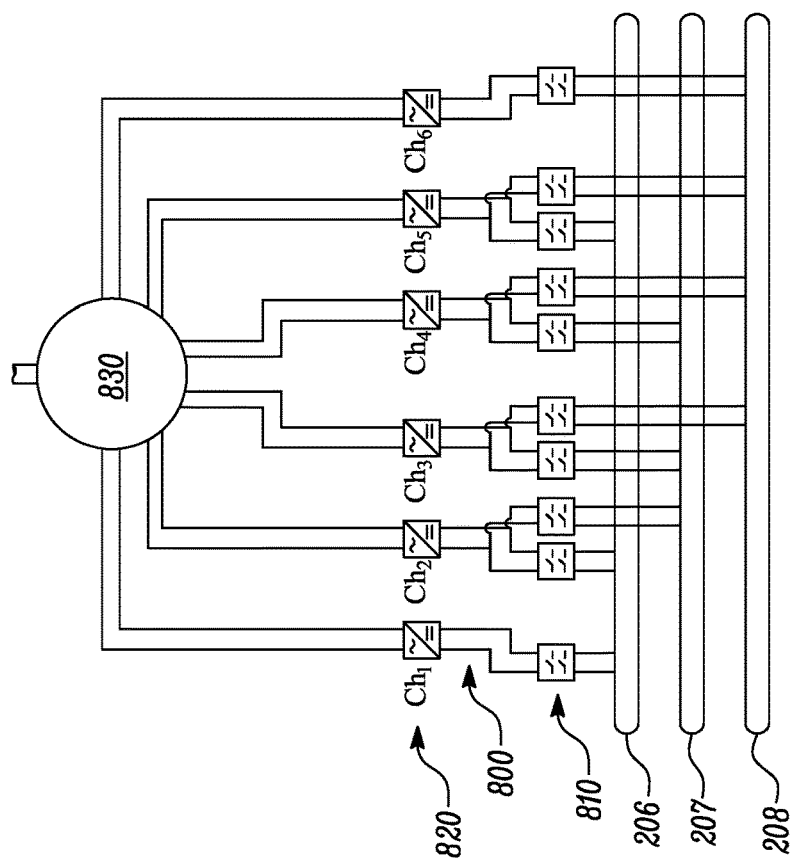
FIG. 8 shows an alternative switching arrangement for connecting a group of N=6 dc load channels to R=3 dc power channels.
Figure 10:
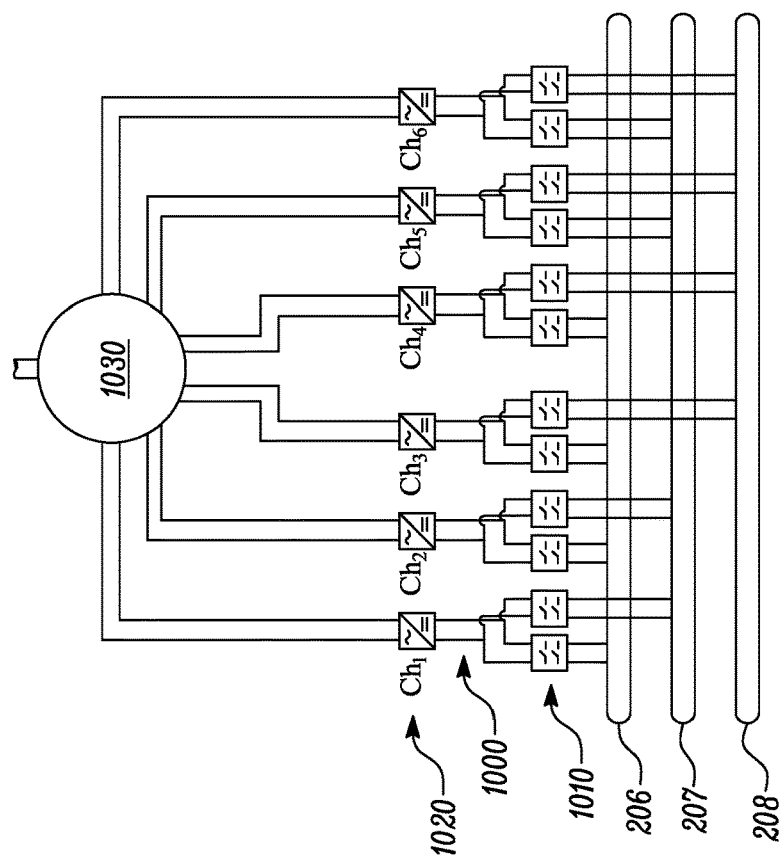
FIG. 10 shows still a further alternative switching arrangement for connecting a group of N=6 dc load channels to R=3 dc power channels.
Figure 9:
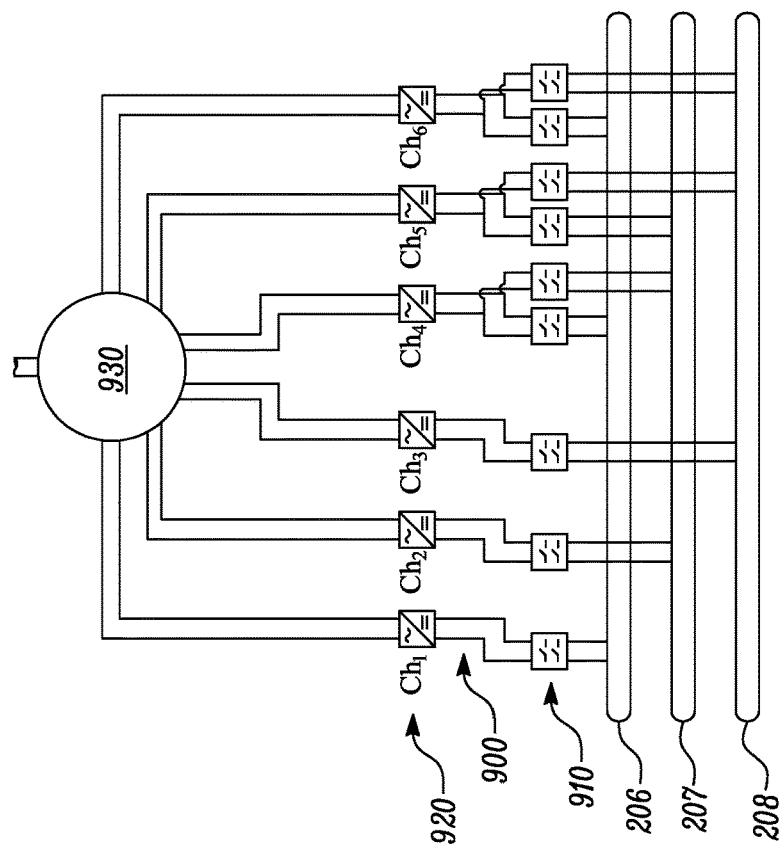
FIG. 9 shows a further alternative switching arrangement for connecting a group of N=6 dc load channels to R=3 dc power channels.
Figure 11:
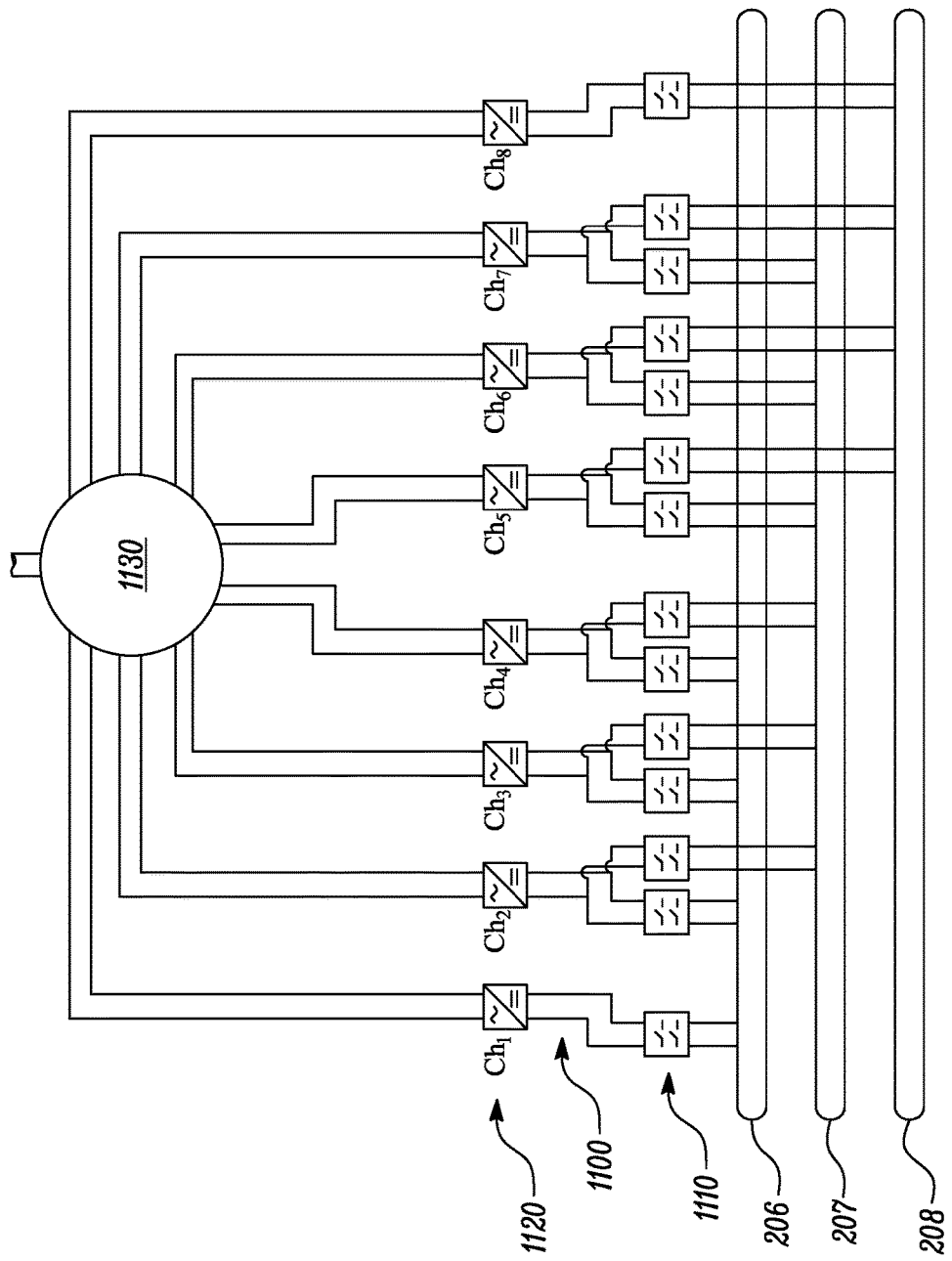
FIG. 11 shows a switching arrangement for connecting a group of N=8 dc load channels to R=3 dc power channels.

An example for which R=2, N=4 is described in detail with reference to FIG. 4. Further N=2R examples are described for R=3 and R=4 with reference to FIGS. 5 and 6. An R<N<2R example utilising an equivalent switching connection arrangement is described with reference to FIG. 7. FIG. 8-10 illustrate alternative connection arrangements, all using R=3, N=6 as an example. FIG. 11 illustrates a connection arrangement for N>2R, specifically R=3, N=8. Finally, to illustrate some of the advantages associated with the arrangements of FIGS. 4-11, FIG. 12 illustrates a further switching arrangement for R=4, N=8.

The switching arrangements include switching elements, which may be dc contactors, circuit breakers or the like. In the examples described herein, each switching element (e.g. dc contactor 411 in FIG. 4) is a double pole contactor in which each pole of the dc source is isolated from the corresponding load channel. It will however be understood that a single pole switch may be used if desired and considered suitable for the application.

The contactors of the switching arrangement are preferably capable of providing fast fault response and precise control in order to commutate the electrical load current from one power source to another and to minimise the impact of the faults on the functionality of the load(s).

Technologies capable of this include solid-state circuit breakers, and hybrid electromechanical and solid-state circuit breakers.

All of the switching arrangements described herein may incorporate, for some and preferably each of the N dc load channels, current limiting functionality. This is described in more detail with reference to FIGS. 13A-B and 14A-B.

In a system with multiple electrical loads, the electrical power system may include multiple groups of dc load channels connected to and siphoning power from the R dc power channels. For example, a first group consisting of $N_1$ dc load channels may be connected to the R dc load channels and a second group of $N_2$ dc load channels may also be connected to the R dc load channels at a position electrically downstream of the first group. The number $N_1$ of dc load channels in the first group may be the same as or different from the number $N_2$ of dc load channels in the second group. FIG. 4

FIG. 4 illustrates a portion of an electrical power system in which a dual dc power source (i.e. R=2) is connected to a group 400 of N=4 dc load channels by a switching arrangement 410 to facilitate the provision of electrical power to a four-phase (P=4) electrical load. In this embodiment the load is a four-phase permanent magnet motor-generator (PMMG) 430 incorporated into an electric fuel pump of a gas turbine engine. It will be appreciated that other known types of electrical machine, for example a switched reluctance machine, could replace the PMMG of FIG. 4.

The portion of the electrical system includes two dc power channels 206, 207, which may also be referred to as dc busses. The power channels 206, 207 are connected to and receive electrical power from an electrical generation system having one or more rotary electric machines, each connected to a spool of a gas turbine engine. The specific details of the electrical generation system are not relevant to the arrangement of the portion of the system shown in FIG. 4. It is sufficient to say that, in this embodiment, the electrical generation system outputs two dc power channels 206, 207.

The two power channels 206, 207 are electrically connected to the four dc load channels 401-404 via a switching arrangement 410. The switching arrangement 410 includes a set of N=4 switch arrays, the switches of which may be dc contactors, circuit breakers or the like. In total, the set of N=4 switch arrays includes six (2N−2=6) dc contactors 411-416.

The opening and closing of the contactors of the switching arrangement 410 is controlled by a controller, which in the interests of clarity is not shown in FIG. 4. The controller may be the same controller 202 used to control the PEM 115 in FIGS. 2A and 3A, or it may be another functional module of the EEC 117. Said functional module may be implemented in software running on the EEC 117 or in hardware in the EEC 117. Other suitable implementations, for example local control within the PEM 115, will occur to those skilled in the art.

In this embodiment the four load channels output to a set 420 of N=4 converter circuits 421-424, which may be unidirectional (dc to ac) converter circuits or bidirectional converter circuits. In one embodiment the converter circuits 203a-d are H-bridges accompanied by appropriate filters, although it will be appreciated that any other suitable converter topology may be used.

The ac outputs of the converter circuits 421-424 connect to the four phases A-D of the four-phase rotary electric machine 430. It is noted that FIG. 4 only illustrates the connections between the ac outputs of the converters 421-424 and one phase coil A1-D1 per phase. In practice connections will also be made to the other phase coils A1'-D1', if present.

In this embodiment the four-phase rotary machine 430 drives an engine fuel pump. It is to be understood, however, that the four-phase machine 430 could drive another engine accessory (such as an oil pump or cabin blower) or a non-engine electrical load.

In other embodiments, multiple loads may be connected to the output of the switching arrangement 410. In one group of embodiments, the four converter circuits 421-424 may be replaced with a set of converters that includes more than one converter circuit per dc load channel. For example, two four-phase rotary machines may be connected to the switching arrangement 410 by utilizing two converter circuits connected in parallel to each DC load channel. In still further embodiments, a two- or three-phase load may be driven via two or three of the converter circuits and the remaining one or two converter circuits may be omitted, with the remaining one or two dc load channels powering one or more dc loads either directly or via dc-dc converters.

Of particular note is the manner in which the switching arrangement 410 connects the R=2 power channels 206-207 to the N=4 load channels 401-404. This will now be described.

The n=1 load channel 401 is connected to the r=1 power channel 206 via the first contactor 411 of the switching arrangement 410. Specifically, on one side of the switching arrangement 410, the first contactor 411 is connected to the r=1 power channel 206 (by two connections consisting of the +V and −V lines) and, on the other side of the switching arrangement 410, the first contactor 411 is connected to the n=1 load channel 401 (again by two connections consisting of the +V and −V lines).

The n=N=4 load channel 404 is connected to the r=R=2 power channel 207 via the sixth ((2N−2)-th) contactor 416. Specifically, the sixth contactor 416 is connected to the r=2 power channel on one side and is connected to the n=4 load channel 404 on the other side.

The n=2 load channel 402 is connected to the r=1 power channel 206 via the second contactor 412 and is connected to the r=2 power channel 207 via the third contactor 413. Specifically, on one side of the switching arrangement 410, the second contactor 412 is connected to the +V and −V lines of the r=1 power channel 206, whilst the third contactor 413 is connected to the +V and −V lines of the r=2 power channel 207. On the other side of the switching arrangement 410, the +V lines of each of the second and third contactor 412, 413 are connected together to form a +V line of the second load channel 402, whilst the −V lines of each of the second and third contactor 412, 413 are connected together to form a −V line of the second load channel 402.

The n=3 load channel 403 is connected to the r=1 power channel 206 via the fourth contactor 414 and is connected to the r=2 power channel 207 via the fifth contactor 415. Specifically, on one side of the switching arrangement 410, the fourth contactor 414 is connected to the +V and −V lines of the r=1 power channel 206, whilst the fifth contactor 415 is connected to the +V and −V lines of the r=2 power channel 207. The respective +V lines of each of the fourth and fifth contactor pairs 414, 415 are connected together to form a +V line of the third load channel 403. The respective −V lines of each of the fourth and fifth contactor pairs 414, 415 are connected together to form a −V line of the third load channel 403.

Thus, the switching arrangement 410 connects the first load channel 401 to the first power channel 206, connects the second load channel 402 to both the first and second power channels 206, 207, connects the third load channel 403 to both the first and second power channels 206, 207, and connects the fourth load channel 404 to the first second power channel 207. This is summarised in the first and second columns of Table 1:

TABLE 1

| Load Channel | Connected Power Channels | Power Sourcing (r) | | |
|---|---|---|---|---|
| (n) | (r) | Normal | Fault 1 | Fault 2 |
| 1 | 1 | 1 | 0 | 1 |
| 2 | 1 and 2 | 1 | 2 | 1 |
| 3 | 1 and 2 | 2 | 2 | 1 |
| 4 | 2 | 2 | 2 | 0 |
| Max. Load Channels Per Power Channel | | 2 | 3 | 3 |

The controller controls the opening and closing of the contactors of the switching arrangement 410 such that each of the four load channels 401-404 receives power from one of the two power channels 206, 207. For the n=1 load channel 401 this is necessarily the r=1 power channel 206. For the n=4 load channel 404 this is necessarily the r=2 power channel 207. However for the n=2 and n=3 load channels 402, 403, one of the two power channels 206, 207 is preferentially selected by controlling the opening and closing of the contactors 412-415. For instance, the n=2 load channel 402 may be powered by the r=1 power channel 206 by closing the second contactor 412 and opening the third contactor 413. The n=3 load channel 403 may be powered by the r=2 power channel 207 by closing the fifth contactor 415 and opening the fourth contactor 414.

Under normal operating conditions, with no faults in either of the two power channels 206, 207, the controller controls the opening and closing of the contactors so that each of the two power channels 206, 207 powers precisely two of the load channels 401-404. This is summarised in third column of Table 1. Balancing the load channels between the power sources or power channels under normal operating conditions allows the system to run with reduced electrical and thermal stress.

During service it is possible that a fault condition will arise in which one of the two power channels 206, 207 is disrupted. Total or partial loss of power in one of the two channels 206, 207 may occur. In this case, the controller is configured to control the opening and closing of the contactors of the switching arrangement 410 to reduce the impact on the downstream load. Specifically, where a load channel was receiving power from the now-faulted power channel and it is possible to connect the load channel to another power channel, the controller opens the contactor on the faulted channel and closes the contactor on the healthy power channel to provide power to the load channel.

The modified power sourcing in the case of a fault in the r=1 power channel 206 is summarised in the fourth column of Table 1. As can be seen, the loss of power in the r=1 power channel 206 necessarily results in a loss of power in the n=1 load channel 401. However, the controller is able to control the switching arrangement 410 to modify the power sourcing for the n=2 load channel 402 such that three of the four phases of the four-phase load 430 still receive power. The need to power an additional load channel in the case of a fault in one power channel can be accounted for by suitably over-rating each of the power channels.

The modified power sourcing in the case of a fault in the r=2 power channel 207 is summarised in the final column of Table 1 and can be seen to be descriptively equivalent to the r=1 fault case.

Although not included in Table 1, it will be appreciated by those skilled in the art that in the event of a load side fault, the circuit breakers can be opened to protect the associated power source and prevent fault propagation.

Where possible, it also desirable that the connections of and the control of the switching arrangement 410 is such that pairs of electrical phases of the load (in this case pairs of phases electrically separated by 90 degrees) are powered by the same power channels under 'normal' operating conditions. For example, referring to Table 1, under normal operating conditions, the n=1 and n=2 load channels which power adjacent phases A and B (separated electrically by 90 degrees) are both powered by the r=1 power channel. Likewise, the n=3 and n=4 load channels which power adjacent phases C and D (separated by 90 degrees) are both powered by the r=2 power channel. The connection of phases to load channels powered by the same power channels results in the cancellation of the second harmonic in the supply current, which improves power quality at the power source. This may improve efficiency and system stability and reduce negative effects such as torque ripple and filter size. Those skilled in the art will appreciate that the correct groupings of phases is dependent upon the total number of phases and the number of pole-pairs in the machine. The load channel pairs in the example in Table 1 work for an evenly distributed 4-phase, 8-coil electrical machine with a 6 pole-pair rotor, where load channels n and n+1 are electrically distributed by 90 degrees.

FIG. 5

Figure 5:
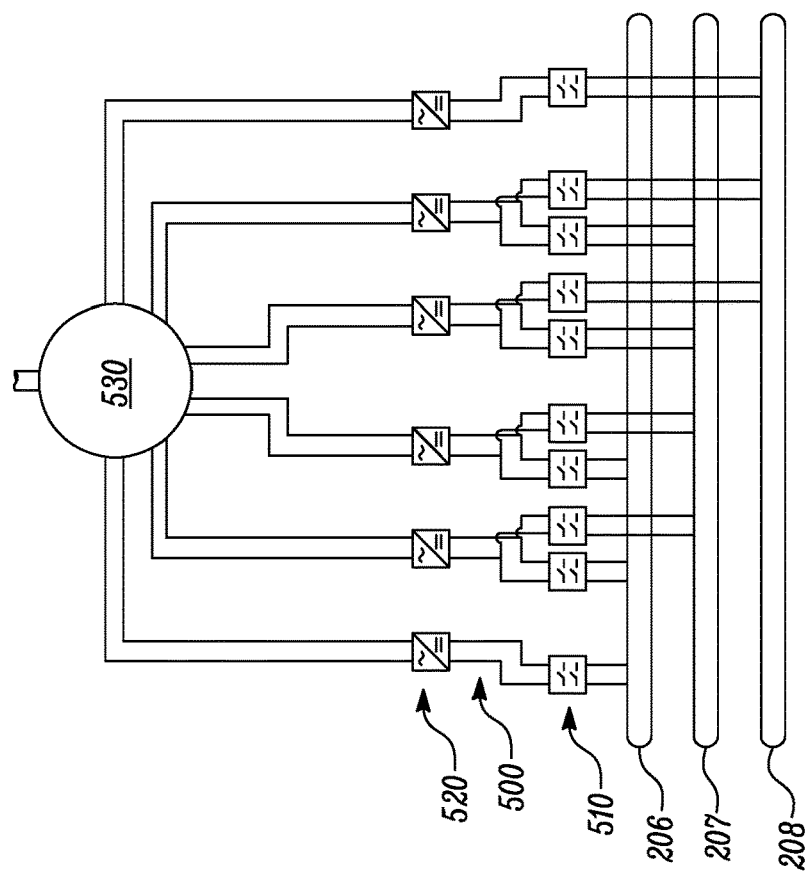
FIG. 5 shows a switching arrangement for connecting a group of N=6 dc load channels to R=3 dc power channels.

FIG. 5 illustrates a portion of another electrical power system. The system is the same as the system of FIG. 4, except that in the embodiment of FIG. 5 there are R=3 dc power channels 206-208, a group 500 of N=6 dc load channels, a set 520 of N=6 converters, the switching arrangement 510 includes ten (2N−2=10) contactors, and the poly-phase load 530 is a six-phase load. As with the embodiment FIG. 4, N=2R.

In the interests of conciseness, insofar as the arrangement and components of FIG. 5 are the same as those of FIG. 4, the description of FIG. 4 will not be repeated for FIG. 5.

As with the FIG. 4 embodiment, the manner in which the switching arrangement 510 connects the R=3 dc power channels 206-208 to the N=6 load channels 500 is of particular interest.

The following relationship, which relates the load channel index n to the power channels indices r for which the switching arrangement 510 provides connections, is now introduced:

$$r(n) = \begin{cases} 1, & n = 1 \\ \frac{n}{2} \text{ and } \frac{n}{2}+1, & 1 < n < N \text{ and } n = 0 \pmod 2 \\ \frac{n-1}{2} \text{ and } \frac{n+1}{2}, & 1 < n < N \text{ and } n = 1 \pmod 2 \\ R, & n = N \end{cases} \quad \text{(Equation 1)}$$

In other words: the first load channel n=1 is connected to only the first power channel r=1; the final load channel n=N is connected to only the final power channel r=N; all remaining load channels for which the index n is even are connected to the (n/2)-th and ((n/2)+1)-th power channels; and all remaining load channels for which the index n is odd are connected to the ((n−1)/2)-th and ((n+1)/2)-th power channels. Equation 1 can be utilised for all values of R and N satisfying R<N≤2R, including the embodiment of FIG. 4 (R=2, N=4) and the present embodiment of FIG. 5 (R=3, N=6).

Applying Equation 1 to the present embodiment gives the arrangement of the connections between the power channels and load channels, and is summarised in the first two columns of Table 2:

TABLE 2

| Load Channel (n) | Connected Power Channels (r) | Power Sourcing (r) | | |
|---|---|---|---|---|
| | | Normal | Fault 1 | Fault 2 |
| 1 | 1 | 1 | 0 | 1 |
| 2 | 1 and 2 | 1 | 2 | 1 |
| 3 | 1 and 2 | 2 | 2 | 1 |
| 4 | 2 and 3 | 2 | 2 or 3 | 3 |
| 5 | 2 and 3 | 3 | 3 | 3 |
| 6 | 3 | 3 | 3 | 3 |
| Max. Load Channels Per Power Channel | | 2 | 3 | 3 |

A controller (not shown) controls the opening and closing of the contactors of the switching arrangement 510 such that each of the six load channels 500 receives power from only one of the three power channels 206-208. For the n=1 load channel this is necessarily the r=1 power channel 206. For the n=6 load channel this is necessarily the r=3 power channel 207. For the n=2, 3, 4 and 5 load channels 402-405, however, one of the two available power channels is selected by controlling the opening and closing of the contactors 510. For instance, the n=2 load channel may be powered by the r=1 power channel 206 by closing the second contactor and opening the third contactor. The n=3 load channel may be powered by the r=2 power channel 207 by closing the fifth contactor and opening the fourth contactor.

Under normal operating conditions, with no faults in any of the three dc power channels 206-208, the controller controls the opening and closing of the contactors so that each of three power channels 206, 207 powers precisely two of the load channels 500. This is summarised in third column of Table 2. Even loading of the power channels 206-208 during normal operation is thereby achieved.

In case of a fault condition in which one of the three power channels 206-208 is disrupted, the controller controls the opening and closing of the contactors of the switching arrangement 510 to reduce the impact on the downstream load. Specifically, where a load channel was receiving power from the now-faulted power channel and it is possible to connect the load channel to another dc power channel, the controller opens and closes contactors accordingly.

The modified power sourcing in the case of a fault in the r=1 power channel 206 is summarised in the fourth column of Table 2. As can be seen, the loss of power in the r=1 power channel 206 necessarily results in a loss of power in the n=1 load channel. However, the controller is able to control the switching arrangement 510 to modify the power sourcing for the n=2 load channel such that five of the six phases of the six-phase load 530 still receive power. The modified power sourcing in the case of a fault in the r=2 power channel 207 is summarised in the final column of Table 2. The response to a fault in the third power channel 208 is not shown in Table 2 but will be readily understood in view of the above description.

As explained above with reference to FIG. 4, in order to cancel the second harmonic in the supply it is desirable for the power sourcing of the load channels to be arranged so that pairs of electrical phases are powered by the same power channels. In FIG. 5, the number of phases P=6, so pairs of phases electrically separated by 60 degrees are preferably powered by the same power channel; resulting in a reduction in harmonic content. Thus, referring to Table 2, under normal operating conditions, load channels n=1 and n=2 (powered by power channel r=1) power one adjacent pair of phases; load channels n=3 and n=4 (powered by power channel r=2) power another adjacent pair of phases; and so forth. If possible, this approach to power sourcing may also be used following a fault in a power channel, but as can be seen from Table 2 it cannot be followed for all of the phases.

FIG. 6

Figure 6:
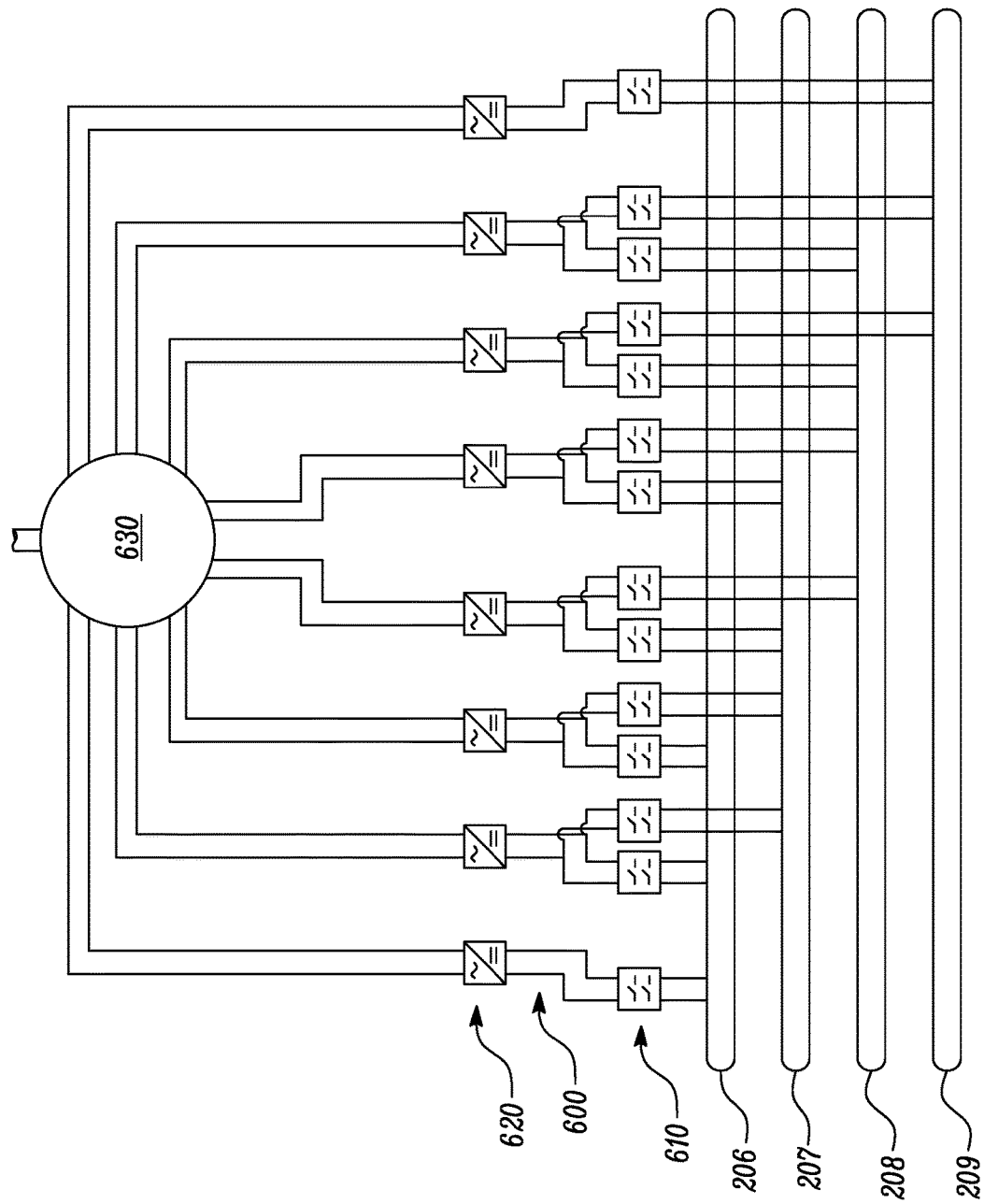
FIG. 6 shows a switching arrangement for connecting a group of N=8 dc load channels to R=4 dc power channels.

FIG. 6 illustrates a portion of another electrical power system. The system is the same as the systems of FIGS. 4 and 5, except that in the embodiment of FIG. 6 there are R=4 dc power channels 206-209, a group 600 of N=8 dc load channels, a set 620 of N=8 converters, the switching arrangement 610 includes fourteen (2N−2=14) contactors, and the poly-phase load 630 is an eight-phase load. As with the embodiments of FIGS. 4 and 5, N=2R.

In the interests of conciseness, insofar as the arrangement and components of FIG. 6 are the same as those of FIGS. 4 and 5, the description will not be repeated.

Applying Equation 1 to the R=4, N=8 embodiment of FIG. 6 gives the arrangement of the connections between the power channels and load channels, and is summarised in the first two columns of Table 3:

TABLE 3

| Load Channel (n) | Connected Power Channels (r) | Power Sourcing (r) | | |
|---|---|---|---|---|
| | | Normal | Fault 1 | Fault 2 |
| 1 | 1 | 1 | 0 | 1 |
| 2 | 1 and 2 | 1 | 2 | 1 |
| 3 | 1 and 2 | 2 | 2 | 1 |
| 4 | 2 and 3 | 2 | 2 or 3 | 3 |
| 5 | 2 and 3 | 3 | 3 or 2 | 3 |
| 6 | 3 and 4 | 3 | 3 | 3 or 4 |
| 7 | 3 and 4 | 4 | 4 | 4 or 3 |
| 8 | 4 | 4 | 4 | 4 |
| Max. Load Channels Per Power Channel | | 2 | 3 | 3 |

Once again, a controller controls the opening and closing of the contactors of the switching arrangement. Specifically:

i. At all times, each one of the load channels 600 receives power from only one of the power channels to which it is connectable by the switching arrangement 610. This can be seen in all of the columns of Table 3.

ii. In normal, non-faulted, operation, each power channel 206-209 powers the same number (two) of load channels. This evenly spreads the load 630 amongst the power channels 206-209.

iii. Also in normal, non-faulted operation, where possible, commonly powered load channels are paired with pairs of phases of the load so as to cancel the harmonics in the supply current.

iv. In case of a fault in one of the power channels 206-209, the load channel power sourcing is modified so that load channels are, if possible, not connected to the faulted power channel.

v. Preferably, the modification is made holistically such that, after the modification, no power channel powers a number of load channels exceeding three (N/R+1=3).

FIG. 7

Figure 7:
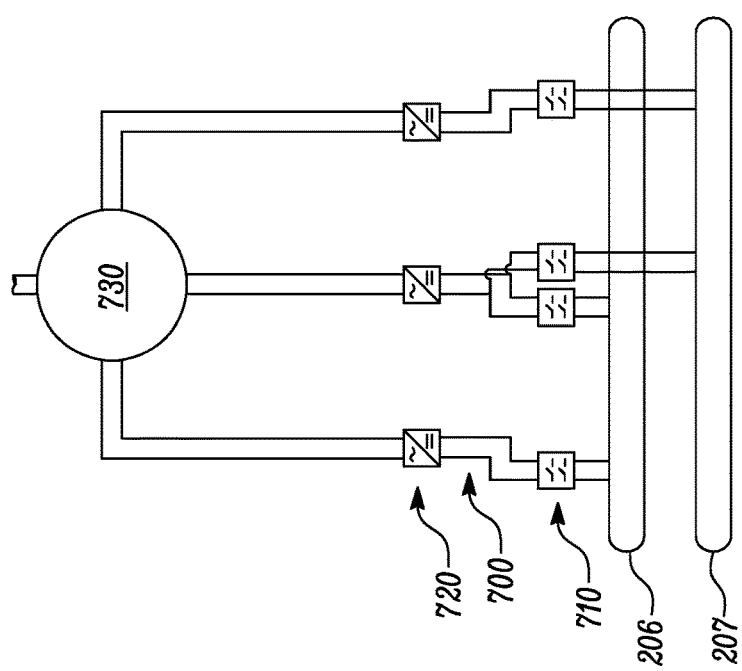
FIG. 7 shows a switching arrangement for connecting a group of N=3 dc load channels to R=2 dc power channels.

In each of the examples described above, the number of load channels N is equal to twice the number of power channels R, i.e. N=2R. However, the connection arrangement described by Equation 1 can be applied equally to the case where R<N<2R. FIG. 7 illustrates an example in which three load channels 700 are connected to two power channels 206-207 by a switching arrangement 710.

Applying Equation 1 to the R=2, N=3 embodiment of FIG. 7 gives the arrangement of the connections between the power channels 206, 207 and load channels 700, and is summarised in the first two columns of Table 4:

TABLE 4

| Load Channel | Connected Power Channels | Power Sourcing (r) | | |
|---|---|---|---|---|
| (n) | (r) | Normal | Fault 1 | Fault 2 |
| 1 | 1 | 1 | 0 | 1 |
| 2 | 1 and 2 | 1 or 2 | 2 | 1 |
| 3 | 2 | 2 | 2 | 0 |
| Max. Load Channels Per Power Channel | | 2 | 2 | 2 |

Once again, a controller controls the opening and closing of the contactors of the switching arrangement. Specifically:

i. At all times, each one of the load channels 700 receives power from only one of the power channels to which it is connectable by the switching arrangement 710.

ii. In normal, non-faulted, operation, each power channel 206-207 powers at most two load channels. Since N/R is not an integer where R<N<2R, the load cannot be spread equally between the power channels during normal operation.

iii. In case of a fault in one of the power channels 206-207, the load channel power sourcing is modified so that load channels are, if possible, not connected to the faulted power channel.

iv. Preferably, the modification made in response to the fault is made holistically such that, after the modification, no power channel powers a number of load channels exceeding ⌈N/R⌉+1. It will be understood that ⌈N/R⌉ is the roofed value of N/R (i.e. the smallest integer greater than or equal to N/R). It is noted that for the specific case of R=2, N=3, no power channel powers greater than two load channels (i.e. ⌈N/R⌉, rather than ⌈N/R⌉+1). For higher values of N this will not be possible.

While the embodiment of FIG. 7 includes N=3 load channels for powering a three-phase electrical load, it may be preferable, regardless of the value of R, for N to be at least four (i.e. preferably, N≥4). In this way, if power is lost in a load channel as a result of either a fault in a power channel or a fault in the load channel, at least three electrical phases can remain. In practice three phases may be the minimum desirable number of phases for powering fault-tolerant electrical loads.

FIG. 8-10

Whilst FIGS. 4-7 show switching arrangements 410-710 with connections conforming to Equation 1, alternative connection arrangements are possible. To this end, FIGS. 8-10 and Tables 5-7 illustrate some alternative switching arrangements. The R=3, N=6 case is used by way of example.

First referring to FIG. 8 and Table 5, there is shown a switching arrangement 810 having ten (2N−2=10) contactors. The contactors of the switching arrangement 810 connect the first load channel (n=1) to only the first power channel (r=1); connect the final load channel (n=N=6) to only the final power channel (r=R=3); and connect each of the remaining six (N−2=6) load channels to two different power channels. This is similar to the arrangement described with reference to FIG. 5 and more generally Equation 1. However, the way in which the switching arrangement 810 connects the intermediate load channels (n=2, 3, 4 and 5) to the power channels 206-208 is different than that defined by Equation 1.

TABLE 5

| Load Channel | Connected Power Channels | Power Sourcing (r) | | |
|---|---|---|---|---|
| (n) | (r) | Normal | Fault 1 | Fault 2 |
| 1 | 1 | 1 | 0 | 1 |
| 2 | 1 and 2 | 1 | 2 | 1 |
| 3 | 2 and 3 | 2 | 2 or 3 | 3 |
| 4 | 2 and 3 | 2 | 3 or 2 | 3 |
| 5 | 1 and 3 | 3 | 3 | 1 |
| 6 | 3 | 3 | 3 | 3 |
| Max. Load Channels Per Power Channel | | 2 | 3 | 3 |

Comparing Table 3 and Table 5, it can be seen from the third columns that the normal power sourcing is the same. Furthermore, as can be seen from the final rows of the tables, the maximum number of load channels per power channel is the same when there is a fault in one of the power channels. However, it can be seen from the fourth and fifth columns of the tables that the required modification to the power sourcing in the event of a fault in one power channel is different.

Now referring to FIG. 9 and Table 6, there is shown a switching arrangement 910 having nine (2N−R=9) contactors. The contactors of the switching arrangement 910 connect the first, second and third load channels (n=1, 2 and 3, i.e. the first R load channels) to the first, second and third power channels (r=1, 2, 3) respectively. Each of the remaining three (N−R=3) load channels is connected to two different power channels. Thus, unlike the arrangements of FIGS. 4-8 in which only the first and final load channels are connected to only one load power channel, in FIG. 9 there are R (R=3) load channels connected to only one power channel.

TABLE 6

| Load Channel | Connected Power Channels | Power Sourcing (r) | | |
|---|---|---|---|---|
| (n) | (r) | Normal | Fault 1 | Fault 2 |
| 1 | 1 | 1 | 0 | 1 |
| 2 | 2 | 2 | 2 | 0 |
| 3 | 3 | 3 | 3 | 3 |
| 4 | 1 and 2 | 1 | 2 | 1 |
| 5 | 2 and 3 | 2 | 2 or 3 | 3 |
| 6 | 1 and 3 | 3 | 3 | 1 or 3 |
| Max. Load Channels Per Power Channel | | 2 | 3 | 3 |

Comparing Table 6 with Tables 3 and 5, it can be seen from the third columns that, aside from the ordering of the rows, the normal power sourcing is the same. Furthermore, as can be seen from the final rows of the tables, the maximum number of load channels per power channel is the same when there is a fault in one of the power channels. However, it can be seen from the fourth and fifth columns of the tables the required modification to the power sourcing in the event of a fault in one power channel is different.

The connection of a greater number (R) of load channels to only one power channel further reduces the number of contactors and other components present in the load channels, thus reducing weight and electrical losses without necessarily compromising on fault tolerance.

Now referring to FIG. 10 and Table 7, there is shown a switching arrangement 1010 having twelve (2N=12) contactors. The contactors of the switching arrangement 1010 connect each of the load channels 1000 to two different power channels. Thus, unlike the arrangements of FIGS. 4-9 in which some of the load channels are connected to only one power channel, in FIG. the switching arrangement 1010 connects each and every one of the load channels 1000 to two different power channels.

TABLE 7

| Load Channel | Connected Power Channels | Power Sourcing (r) | | |
|---|---|---|---|---|
| (n) | (r) | Normal | Fault 1 | Fault 2 |
| 1 | 1 and 2 | 1 | 2 | 1 |
| 2 | 1 and 2 | 2 | 2 | 1 |
| 3 | 1 and 3 | 3 | 3 | 1 or 3 |
| 4 | 1 and 3 | 1 | 3 | 3 or 1 |
| 5 | 2 and 3 | 2 | 2 or 3 | 3 |
| 6 | 2 and 3 | 3 | 3 or 2 | 3 |
| Max. Load Channels Per Power Channel | | 2 | 3 | 3 |

Comparing Table 7 with Tables 3 and 5-6, it can be seen from the third columns that, aside from the ordering of the rows, the normal power sourcing is the same. Furthermore, as can be seen from the final rows of the tables, the maximum number of load channels per power channel is the same when there is a fault in one of the power channels. However, it can be seen from the fourth and fifth columns that the required modification to the power sourcing is different.

The connection of each and every load channel to two different power channels increases the component count and thus system weight, and potentially increases electrical losses. However, in some applications this may be offset by an increase in the ability to rebalance the load following a fault which may, for example, reduce the harmonic content of the current supplied to the load and thus reduce the magnitude of negative effects such as torque ripple. Furthermore, this arrangement may improve the ease of manufacture and assembly, for example where the contactors and power electronic modules are co-packaged and standardised. FIG. 11

In each of the embodiments described above the number of load channels N segregated from the R power channels satisfies R<N≤2R. However, the present disclosure also provides electrical power systems in which N>2R. To this end, FIG. 11 illustrates an example in which N>2R, specifically an example in which R=3, N=8.

Whilst other arrangements are possible, in FIG. 11 the switching arrangement 1110 includes fourteen (2N−2=14) contactors. The contactors connect the first load channel (n=1) to only the first power channel (r=1); connect the final load channel (n=N=8) to only the final power channel (r=R=3); and connects each of the remaining six (N−2=6) load channels to two different power channels. The second, third and fourth load channels are each connected to both the first and second power channels. The fifth, six and seventh load channels are each connected to both the second and third power channels. This is summarised in the first and second columns of Table 8:

TABLE 8

| Load Channel | Connected Power Channels | Power Sourcing (r) | | |
|---|---|---|---|---|
| (n) | (r) | Normal | Fault 1 | Fault 2 |
| 1 | 1 | 1 | 0 | 1 |
| 2 | 1 and 2 | 1 | 2 | 1 |
| 3 | 1 and 2 | 1 | 2 | 1 |
| 4 | 1 and 2 | 2 | 2 | 1 |
| 5 | 2 and 3 | 2 | 2 or 3 | 3 |
| 6 | 2 and 3 | 2 | 3 | 3 |
| 7 | 2 and 3 | 3 | 3 | 3 |
| 8 | 3 | 3 | 3 | 3 |
| Max. Load Channels Per Power Channel | | 3 | 4 | 4 |

As can be seen from the third column of Table 8, during normal operation each of the power channels provides power to at most three ((i.e. ⌈N/R⌉=3) load channels. This is greater than the at most two (⌈N/R⌉=2) load channels that must be powered by the power channels in the R<N≤2R examples described above.

In the event of a fault in one of the power channels, a controller controls the switching arrangement so that each load channels is, if possible, not connected to the faulted power channel. The modification is performed holistically so that number of load channels that a power channel must power does not exceed four (i.e. ⌈N/R⌉+1=4).

From the above description of FIGS. 4-11, it will be appreciated that various fault-tolerant connection arrangements are within the scope of the present disclosure. Whilst some of the connection arrangements are descriptively different, each can be characterized by the following properties:

i. N>R. That is, the number of load channels (N) segregated from the power supply is greater than the number of power channels (R) of the power supply.

ii. The switching arrangement can connect a number (Q) of the N load channels to two different power channels. The number Q is greater than or equal to one and preferably Q is greater than or equal to N−R.

iii. Except where a load channel is powered by multiple power channels (as described below), each one of the load channels receives power from at most one of the power channels to which it is connectable by the switching arrangement. A load channel may receive power from zero power channels where all of the connectable power channels are faulted, and possibly also for load balancing reasons following a fault affecting other load channels.

iv. The switching arrangement and the control of the switching arrangement is such that in normal, non-faulted, operation, each power channel powers at most ⌈N/R⌉ load channels. Where N is an integer multiple of R, this results in equal sharing of the load between the power channels. As noted above, ⌈N/R⌉ is the roofed value of N/R i.e. the smallest integer greater than or equal to N/R.

v. In case of a fault in one of the power channels, a controller controls the switching arrangement to modify the load channel power sourcing. The power sourcing is modified so that each load channels is, if possible, not connected to the faulted power channel.

vi. The switching arrangement and the control of the arrangement is holistic such that, in the faulted condition, after the modification to the power sourcing, no power channel powers a number of load channels exceeding $\lceil N/R \rceil + 1$.

The above-described switching arrangements and control schemes may provide one or more of the following advantages:

a) Increasing the number of independent load channels which power a load improves the fault tolerance. For example, a four segregated phase motor drive may run on three phases in the event of a fault. This improved fault tolerance reduces the need to over-rate the installed power capacity of the generation and distribution system. However, the fault tolerant electrical systems which provide the R power channels generally have a lower optimum number of power channels to reduce complexity, weight and volume. The provision of a system that allows R power channels to interface with a larger number N load channels is thus advantageous because it limits the complexity of the power generation system, whilst still allowing for the improved fault tolerance and reduced system over-rating provided by the increased number N of load channels.

b) The loss of any single power channel results in the loss of at most one load channel and thus at most one phase of the poly-phase load. The loss of electrical and mechanical balance in the load may thus be relatively minor.

c) The above advantage may be achieved with a minimum of additional loading to the remaining non-faulted power channels. Each remaining, non-faulted, power channel may contribute to the powering of at most one additional load channel (i.e. at most $\lceil N/R \rceil + 1$).

d) As mentioned above in point a), the power channels may be over-rated so that the electrical demands of the poly-phase load(s) and the wider electrical system can be met in the event of the total loss of one power channel. The described connection arrangement and control scheme may contribute to a reduction in the amount by which the power channels must be over-rated to achieve this aim, since any power loss is split amongst all remaining, non-faulted, power channels. Reducing the amount by which the power channels must be over-rated may provide improvements in terms of electric machine size and weight, converter size and weight, insulation rating and the like.

e) While the connection of load channels to two different power channels principally provides tolerance against power channel faults, it also mitigates against faults in the connections between the power channels and the load channels. A failure in one connection can be overcome by utilising the other connection.

f) The presence of the switching arrangement allows faulted loads or even faulted phases of a load to be isolated from the remainder of the electrical power system.

g) Where Q<N, the number of switches in the switching arrangement is reduced, which reduces system weight and complexity. Values of Q=N-2 and Q=N-R may provide particularly good combinations of fault tolerance, relatively low over-rating requirements and weight saving.

In all of the examples described above, load channels are connectable to two different power channels. It is contemplated that some or all of the load channels could be connectable to three or more power channels. However, the use of additional connections would, whilst improving fault-tolerance, add to the weight and complexity of the arrangement and thus the use of two connections is generally preferred.

FIG. 12

Figure 12:
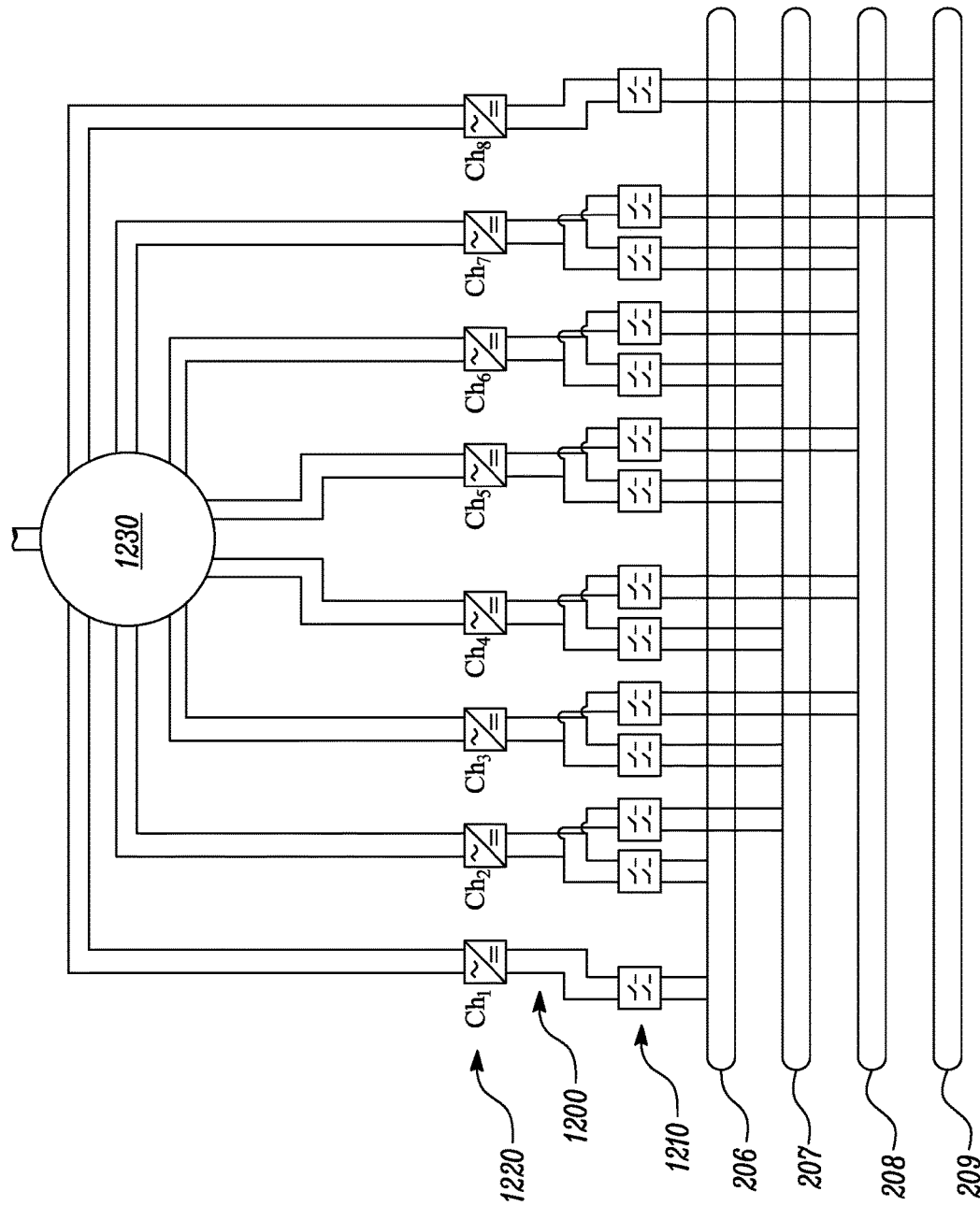
FIG. 12 shows a further switching arrangement for connecting a group of N=8 dc load channels to R=4 dc power channels.

To further illustrate the advantages associated with the above-described embodiments, FIG. 12 shows an alternative switching arrangement 1210 connecting N=8 load channels with R=4 power channels.

The switching arrangement 1210 of FIG. 12 includes fourteen contactors. The contactors connect the first load channel (n=1) to only the first power channel (r=1); connect the final load channel (n=N=8) to only the final power channel (r=R=4); and connect each of the remaining six load channels to two different power channels. The specific arrangement of connections is summarised in Table 9.

TABLE 9

| Load Channel (n) | Connected Power Channels (r) | Power Sourcing (r) | | |
|---|---|---|---|---|
| | | Normal | Fault 1 | Fault 2 |
| 1 | 1 | 1 | 0 | 1 |
| 2 | 1 and 2 | 1 | 2 | 1 |
| 3 | 2 and 3 | 2 | 2 | 3 |
| 4 | 2 and 3 | 2 | 2 or 3 | 3 |
| 5 | 2 and 3 | 3 | 3 | 3 |
| 6 | 2 and 3 | 3 | 3 | 3 |
| 7 | 3 and 4 | 4 | 4 | 4 |
| 8 | 4 | 4 | 4 | 4 |
| Max. Load Channels Per Power Channel | | 2 | 3 | 4 |

Comparing Table 9 with Table 3, which also has R=4 power channels and N=8 load channels, it can be seen from the third columns that the normal power sourcing is the same. Furthermore, it can be seen from the fourth columns that the modified power sourcing in the presence of a fault in the r=1 power channel is equivalent in the sense that the maximum number of load channels per power channel is equal to three ($\lceil N/R \rceil + 1 = 3$).

However, it can be seen from the fifth columns that the modified power sourcing in the presence of a fault in the r=2 power channel is not equivalent: the maximum number of load channels per power channel is equal to three ($\lceil N/R \rceil + 1 = 3$) in Table 3 but is equal to four in Table 9. Thus, if the connection arrangement of FIG. 12 and Table 9 is adopted, the amount by which the power channels must be over-rated to provide equivalent fault-tolerance to the arrangement of FIG. 6 and Table 3 is greater.

Therefore, whilst the arrangement shown in FIG. 12 may provide improvements over some alternative arrangements (arrangements without any switching arrangement, for example), it may be less preferred than the other arrangement described above which may provide greater fault-tolerance or at least equivalent fault-tolerance with less component over-rating.

Load Channels Powered by Multiple Power Channels

In each of the embodiments described above, a load channel that is connectable to two power channels receives electrical power from only one of the two power channels. For example, referring to FIG. 4 and Table 1, the n=2 load channel 402 is connectable to both the r=1 power channel 206 and the r=2 power channel 207 by the contactors 412, 413, but receives power from only one of the power channels at any one time. In a non-faulted condition, the n=2 load channel 402 receives power from the r=1 power channel 206, but in case of a fault in the r=1 power channel receives power from the r=2 power channel by closing the third contactor 413.

In an alternative group of embodiments, a load channel (e.g. load channel 402) may receive electrical power from both of the connected power channels (e.g. power channels 206, 207) in the non-fault condition. This can be achieved by closing both of associated contactors (e.g. contactors 412, 413). In the case of a fault in one of the two power channels (e.g. power channel 206), the power sourcing inherently switches to the other, healthy power channel (e.g. power channel 207).

A constraint of this approach is that, since both contactors 412, 413 will be closed when a fault in one of the power channels 206, 207 occurs, it is necessary for the switching arrangement 410 to provide electrical segregation between the two power channels 206, 207 to prevent the disruption of one power channel from propagating to the non-faulted power channel. Suitable segregation may be provided by using fast acting solid-state circuit breakers to commutate the supply current from the faulted to the healthy power channel, for example based upon undervoltage events on a power channel, whilst maintaining continuity of supply to the load channels. This may significantly reduce fault ride through capability requirements on the load channels. For load channel side faults, fast acting solid-state circuit breakers will isolate in a similar capacity breaking to fault currents. In both cases, Current Limiting Devices such as Silicon Carbide (SiC) JFETs may be used to dynamically limit fault levels.

Whether or not it is possible to provide sufficient segregation will depend to some extent on the application requirements (e.g. the voltage and power of the system, the cost associated with providing segregation suitable for the voltage and power, and the relevant safety and certification requirements of the application), but if it is possible then this approach may be preferred. This is partly because this approach will inherently improve the fault response time, since no contactors need to be opened or closed to respond to the fault.

To further illustrate the alternative power sourcing of the present group of embodiments, Table 10 below illustrates the connections arrangement and power sourcing for the R=2, N=4 arrangement of FIG. 4.

TABLE 10

| Load Channel (n) | Connected Power Channels (r) | Power Sourcing (r) | | |
|---|---|---|---|---|
| | | Normal | Fault 1 | Fault 2 |
| 1 | 1 | 1 | 0 | 1 |
| 2 | 1 and 2 | 1 and 2 | 2 | 1 |
| 3 | 1 and 2 | 1 and 2 | 2 | 1 |
| 4 | 2 | 2 | 2 | 0 |
| Max. Load Channels Per Power Channel | | 2 | 3 | 3 |

As can be seen, the intermediate n=2, n=3 load channels are not only connectable to both the r=1, r=2 power channels, but in normal, non-faulted operation they receive power from both of the two power channels. The power sourcing in the case of a fault in one of the two power channels is the same as in Table 1, though this achieved without having to open or close any contactors because all of the contactors are normally closed.

Also of note is the maximum number of load channels per power channel under normal operating conditions. It should be appreciated that although each of the two power channels provides some power to three and not two load channels, the power supplied to the intermediate load channels n=2, n=3 is shared between two power channels and is thus equal to half of one load channel per power channel. The maximum number of load channels per power channel is thus equal to two, and not three.

A further example is provided in Table 11 below, which summarizes the connection arrangement and alternative power sourcing when applied to the N=2, R=3 case of FIG. 7.

TABLE 11

| Load Channel (n) | Connected Power Channels (r) | Power Sourcing (r) | | |
|---|---|---|---|---|
| | | Normal | Fault 1 | Fault 2 |
| 1 | 1 | 1 | 0 | 1 |
| 2 | 1 and 2 | 1 and 2 | 2 | 1 |
| 3 | 2 | 2 | 2 | 0 |
| Max. Load Channels Per Power Channel | | 2 | 2 | 2 |

Comparing Table 11 with Table 4, it can be seen that, using the alternative power sourcing, the n=2 load channel is powered by both the r=1 and r=2 power channels under normal operating conditions. Thus, even though the ratio N/R is not equal to an integer, the load can be spread evenly between the power channels.

It will be appreciated that although the alternative power sourcing technique has only been described with reference to FIGS. 4 and 7, it could equally be applied to any of the other embodiments described above. The control schemes—particularly the holistic control of the switching arrangement to limit the power channel loading to [N/R]+1 load channels per power channel—applies equally to this group of embodiments.

Furthermore, it could be applied to some but not all of the load channels connectable to two different power channels. For example, in Table 10, the n=2 load channel may receive power from both the r=1 and r=2 power channels during normal operation, whereas the n=3 load channel may receive power from only one of the two power channels during normal operation.

FIGS. 13A-13B

The reconfigurable switching arrangements 410-1210 described above provide fault-tolerance in case of a disruption to one or more of the power channels that supply power to the load channels. Furthermore, in case of a fault in a load, the switching arrangements 410-1210 allow the entire load or a subset of the load channels or phases to be isolated from the remainder of the electrical power system. However, the switching arrangements 410-1210 may not provide complete fault-tolerance, and in particular may not always prevent faults or transient events in one load from disrupting the power channels and the other loads that are connected to the power channels.

For instance, even if a faulted load can be isolated, the faulted load could draw an excessive current from the power channels in the time between the fault arising and the isolation of the load. This could starve other, non-faulted, loads of power or expose the other loads to voltage dips. As another example, a transient event caused by a load will generally not require the load to be isolated, but could cause over-voltage events that propagate to other loads connected to the power channels.

To address these problems, the load channels may, optionally, include current limiting devices (CLDs). The CLDs may be incorporated into, or be connected upstream or downstream from, the contactors of the switching arrangements.

Figure 13A:
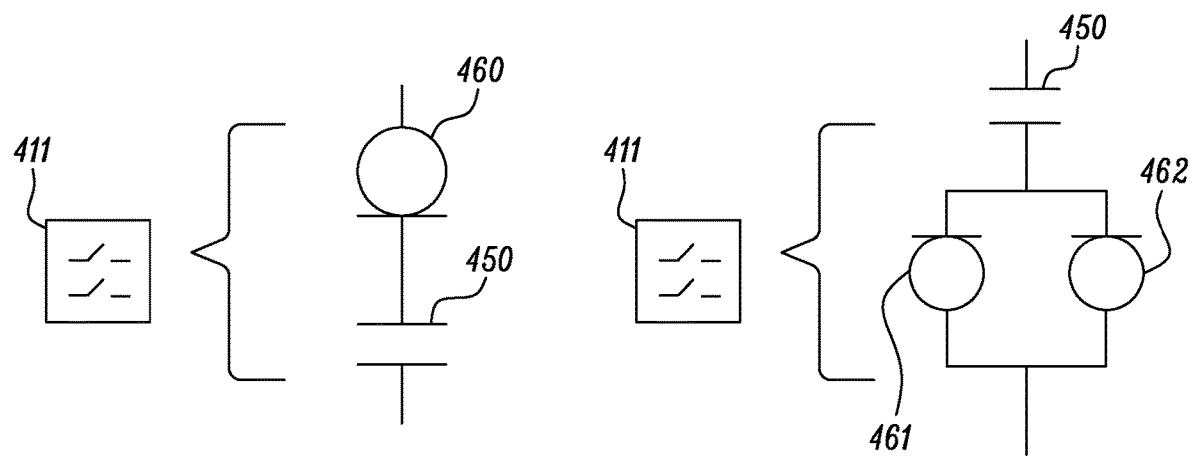
FIG. 13A shows combinations of a switch and a current limiting device.

A CLD is a component with a variable impedance that acts to limit the magnitude of the current flow, for example in response to an upstream or downstream fault or transient event. FIG. 13A illustrates how each of the contactors or circuit breakers (e.g. the contactors 411) shown in the systems of FIGS. 4-12 may include not only a contactor 450 but also, connected in series with the contactor 450, a CLD 460. The CLD 460 may be unidirectional or bidirectional. For example the dc contactor may be connected in series with a single unidirectional CLD 460 (left hand drawing in FIG. 13A) or a bidirectional CLD formed from a pair of unidirectional CLDs 461, 462 connected in anti-parallel.

Figure 13B:
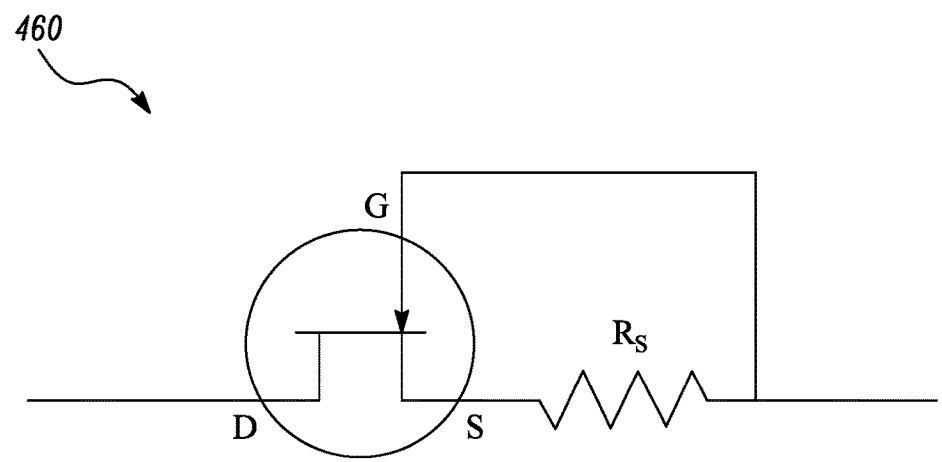
FIG. 13B shows an exemplary current limiting device in the form of a current limiting diode.

The CLD 460 may be a passive component such as an inductor; an active component such as a current-limiting diode; or another component such as a superconducting fault current limiter. By way of example, FIG. 13B illustrates a design for a current-limiting diode 460 (sometimes referred to as a constant-current diode), which includes an n-channel JFET whose gate terminal is shorted to the source terminal with an interconnecting resistor.

FIG. 14A

Figure 14A:
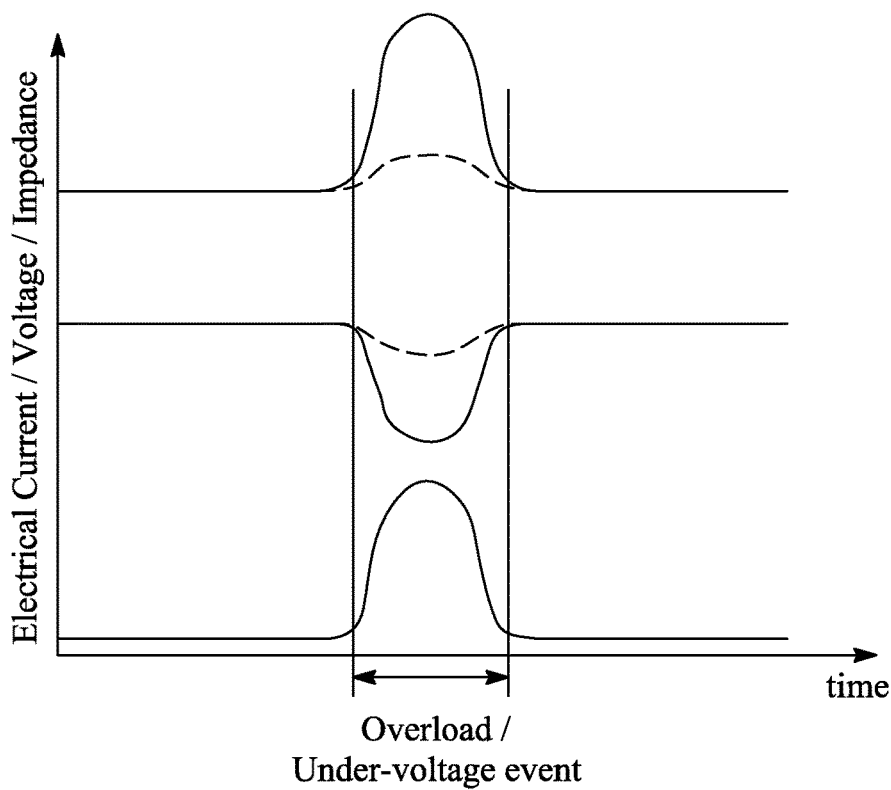
FIG. 14A shows how a current limiting device responds to a downstream electrical overload and how this affects the current drawn from the power channels and the voltage across other loads.

FIG. 14A illustrates how the use of a CLD connected in a load channel can improve the fault-tolerance of an electrical power system against a fault arising in an electrical load powered by the load channel.

The top-most curve of FIG. 14A shows how the current drawn by a load changes when a fault arises in the load. The middle curve shows the change in the voltage experienced by another, non-faulted, load that is connected to the same power channel by another load channel. The bottom-most curve shows how the dynamic impedance of a CLD connected to the faulted load changes when the fault arises. In the top-most curve and middle curve, solid lines represent the system response when no CLD is present. The dotted lines represent the system response when the CLD is present.

First considering the system without the CLD, it can be seen that when the load fault arises, the current drawn by the load from the electrical generator and power channel rises rapidly. In response to this, there is a voltage drop on the power channel and thus the other, non-faulted load experiences a sudden and significant under-voltage event. The under-voltage event may be such that the non-faulted load cannot draw sufficient electrical power from the power channel until the fault is resolved or isolated. This may be particularly problematic if the non-faulted load has a critical function. For example, if the non-faulted load is a propulsive load or a fuel pump, an associated aircraft may experience a temporary loss of thrust. As another example, if the non-faulted load is an oil pump or coolant pump, engine or aircraft components may be damaged or suffer increased wear if there is a temporary loss of function.

Now considering the system with the CLD, when the load fault arises, the current drawn by the load from the electrical generator and power channels begins to rise. In response to this rise, the impedance of the CLD rises rapidly to curtail the rise in the current drawn by the faulted load. Thus, the rise in the current drawn by the faulted load quickly levels off and the associated voltage drop experienced by the non-faulted load is minor and does not affect its function.

FIG. 14B

Figure 14B:
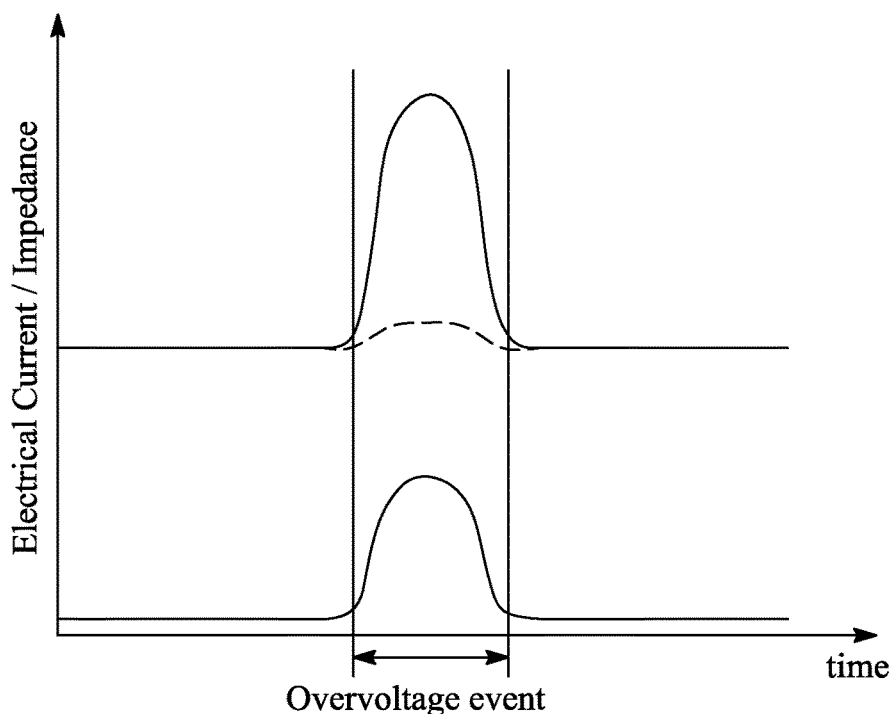
FIG. 14B shows how a current limiting device responds to a downstream transient over-voltage event and how this affects the voltage across other loads.

FIG. 14B illustrates how the use of a CLD connected in a load channel can improve the response of an electrical power system when a transient over-voltage event occurs in a load. The bottom curve shows how the dynamic impedance of a CLD connected to the load that experiences the transient event changes in response to the transient. The top curve shows how the voltage level experienced by another load changes when the transient event occurs. In the top curve, the solid line represents the response when no CLD is present whilst the dotted line represents the response the CLD is present.

First considering the response where no CLD is present, the over-voltage transient rapidly propagates to the other load since the other load is connected to the same power channel. This may result in the other load electrically failing due to electrical breakdown, or suddenly drawing a much larger amount of electrical power, which could damage the load or at least temporarily affect its function. Once again, this may be a particular problem if the other load has a critical function.

Now considering the system with the CLD, the CLD reacts to the transient event by rapidly increasing its impedance. This rapid increase in impedance limits the resulting increase in the over-voltage and thus protects the other load from the transient event.

Thus, it will be understood that by combining the switching arrangements described with reference to FIGS. 4-12 with CLDs in the load channels, a reconfigurable and highly fault-tolerant electrical power system is achieved. Specifically, no single fault in a power channel can affect more than one load channel per group of load channels, and no fault in one load channel can disrupt other load channels and indeed other loads. In combination with a multi-redundant generator system such as the ones described with reference to FIGS. 2-3, an electrical power and distribution system is provided in which a wide array of faults can be managed and in which no single fault can have a significant impact on the overall system.

Whilst the present embodiments have been described with respect to gas turbine engines, it is contemplated that the electrical power system configurations described herein may be extended to facilitate connection of rotary electric machines with other types of rotating machinery. For example, the rotary electric machines may be connected with other types of heat engines, for example internal combustion engines such as reciprocating or Wankel-type engines. Other types of heat engines such as steam turbines operating according to the Rankine cycle may be connected. Combinations of different types of rotating machinery may be connected.

Thus it will be appreciated that the invention described herein may be expressed as an electrical system for connecting rotary electric machines with other rotating machines, the system having the properties and attributes described above.

It should also be noted that whilst the present embodiments have been described with reference to a turbofan engine 101 for an aircraft, it will be understood that the principles of the described electrical systems may be applied to other installations, for example in a marine environment such as on a naval vessel powered by gas turbines, or in an energy production environment such as in a power station utilising natural gas fired gas turbines, or any other suitable application.

Furthermore, it should be appreciated that whilst the present embodiments have been described with reference to arrangements in which rotary electric machines and an associated set of ac-dc converter circuits output a number R of dc power channels, the R dc power channels may instead be output by an R-channel dc power source, for example an R-channel battery or arrangement of fuel cells. Such an arrangement could, for example, be used in a hybrid-electric or purely electric aircraft having batteries and/or fuel cells configured to output R dc power channels. The n dc load channels may power propulsive or non-propulsive loads.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An electrical power system for distributing electrical power in an aircraft, the electrical power system comprising:
an electrical power source configured to output a number $R \geq 2$ of dc power channels, each dc power channel having a respective index $r=(1, \ldots, R)$; and
a group of N dc load channels connected to the R dc power channels by a switching arrangement, wherein each dc load channel has a respective index $n=(1, \ldots, N)$ and $R < N \leq 2R$, and
the switching arrangement is operable to connect an r-th dc power channel to an n-th dc load channel according to the relationship:

$$r(n) = \begin{cases} 1, & n = 1 \\ \frac{n}{2} \text{ and } \frac{n}{2}+1, & 1 < n < N \text{ and } n = 0 \pmod 2 \\ \frac{n-1}{2} \text{ and } \frac{n+1}{2}, & 1 < n < N \text{ and } n = 1 \pmod 2 \\ R, & n = N \end{cases}$$

2. The electrical power system of claim 1, wherein the electrical power source comprises one or more batteries.

3. The electrical power system of claim 1, wherein N=2R.

4. The electrical power system of claim 1, wherein R=2, 3 or 4.

5. The electrical power system of claim 1, wherein $N \geq 4$.

6. The electrical power system of claim 1, further comprising:
a controller configured to control operation of the switching arrangement.

7. The electrical power system of claim 6, wherein the controller is configured to control the operation of the switching arrangement so that, at all times, each one of N-2 load channels for which $1 < n < N$ receives power from only one of two power channels to which it can be connected by the switching arrangement.

8. The electrical power system of claim 1, wherein, in a no fault condition, each one of N-2 load channels for which $1 < n < N$ receives power from both of two power channels to which it is connected by the switching arrangement.

9. The electrical power system of claim 1, comprising:
a controller configured to control operation of the switching arrangement so that, in a fault condition in which one of the R power channels has a fault, each one of the respective N-2 load channels for which $1 < n < N$ receives power from a non-faulted power channel of two power channels to which the respective load channel can be connected by the switching arrangement.

10. The electrical power system of claim 1, comprising:
a controller configured to control operation of the switching arrangement so that, at all times, each one of the R power channels delivers electrical power to a number of load channels not exceeding $\lceil N/R \rceil + 1$.

11. The electrical power system of claim 1, comprising:
a controller configured to control operation of the switching arrangement so that, in a no fault condition, each one of the R power channels delivers electrical power to a number of load channels not exceeding $\lceil N/R \rceil$.

12. The electrical power system of claim 1, comprising:
a controller configured to control operation of the switching arrangement so that, in a fault condition in which one of the R power channels has a fault, each one of the R power channels delivers electrical power to a number of load channels not exceeding $\lceil N/R \rceil + 1$.

13. The electrical power system of claim 1, comprising:
a controller, wherein
the N dc load channels are connected to and power a poly-phase electrical load, and
the controller is configured to control the switching arrangement so that, in a no fault condition, pairs of phases of the poly-phase electrical load are powered by the same power channels so as to cancel harmonics in current supplied by the power channels.

14. The electrical power system of claim 13, wherein the phases of each pair of phases are electrically separated by 360/P degrees, P being a total number of phases of the poly-phase electrical load.

15. The electrical power system of claim 1, wherein the N load channels are connected to one or more loads including at least one propulsive load.

16. The electrical power system of claim 15, wherein the at least one propulsive load comprises an electric machine comprising at least two submachines.

17. The electrical power system of claim 1, wherein, for each respective load channel of a plurality of N load channels, the switching arrangement includes or is connected to a current limiting device (CLD) operable to limit an amount of current flowing from the power channels to a load connected to the electrical power system via the respective load channel.

18. An aircraft propulsion system comprising:
the electrical power system of claim 1.

19. The aircraft propulsion system of claim 18, comprising:
one or more propulsors, wherein
the R power channels of the electrical power system are arranged to deliver power to the one or more propulsors, and
the N load channels are electrically connected to one or more non-propulsive loads.

20. An aircraft comprising:
the electrical power system of claim 1.

* * * * *